(12) United States Patent
Maruyama

(10) Patent No.: US 8,837,056 B2
(45) Date of Patent: Sep. 16, 2014

(54) ZOOM LENS AND IMAGING DEVICE

(75) Inventor: Masaki Maruyama, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/552,332

(22) Filed: Jul. 18, 2012

(65) Prior Publication Data

US 2013/0033621 A1 Feb. 7, 2013

(30) Foreign Application Priority Data

Aug. 5, 2011 (JP) ................................. 2011-171728

(51) Int. Cl.
*G02B 15/14* (2006.01)
*G02B 15/173* (2006.01)
*G02B 27/64* (2006.01)

(52) U.S. Cl.
CPC ............ *G02B 15/173* (2013.01); *G02B 27/975* (2013.01); *G02B 15/14* (2013.01)
USPC ............................ 359/676; 359/764; 359/557

(58) Field of Classification Search
CPC ...... G02B 15/14; G02B 15/17; G02B 15/173; G02B 15/177; G02B 27/646; G02B 13/0045; G02B 13/006; G02B 13/009
USPC .................................. 359/557, 684, 676–682
See application file for complete search history.

(56) References Cited

U.S. PATENT DOCUMENTS

| | | | | |
|---|---|---|---|---|
| 4,861,145 A | * | 8/1989 | Kikuchi | 359/687 |
| 5,828,499 A | * | 10/1998 | Ohtake | 359/676 |
| 6,010,537 A | * | 1/2000 | Konno et al. | 359/389 |
| 6,061,186 A | * | 5/2000 | Nishio | 359/684 |
| 6,249,389 B1 | * | 6/2001 | Ohtake | 359/684 |
| 7,813,051 B2 | * | 10/2010 | Saori | 359/683 |
| 2009/0080088 A1 | * | 3/2009 | Ohashi | 359/687 |
| 2010/0033838 A1 | * | 2/2010 | Saori | 359/684 |

FOREIGN PATENT DOCUMENTS

| | | |
|---|---|---|
| JP | 08-043734 A | 2/1996 |
| JP | 09-230238 A | 9/1997 |

* cited by examiner

*Primary Examiner* — Thong Nguyen
(74) *Attorney, Agent, or Firm* — Rader, Fishman & Grauer PLLC

(57) ABSTRACT

Disclosed herein is a zoom lens including a first lens group having positive refractive power, a second lens group having negative refractive power, a third lens group having positive refractive power, a fourth lens group having positive refractive power, and a fifth lens group having negative refractive power. The respective lens groups move in magnification variation from a wide angle end to a telephoto end. The fourth lens group is moved in optical axis direction to correct variation of an imaging position in association with magnification variation and perform correction of the imaging position in association with object distance change. Condition expression (1) is satisfied.

$$0.60 < f1/(fw \cdot ft)^{1/2} < 1.10 \quad (1),$$

where
f1: focal length of the first lens group
fw: focal length of the whole system at the wide angle end
ft: focal length of the whole system at the telephoto end

1 Claim, 17 Drawing Sheets

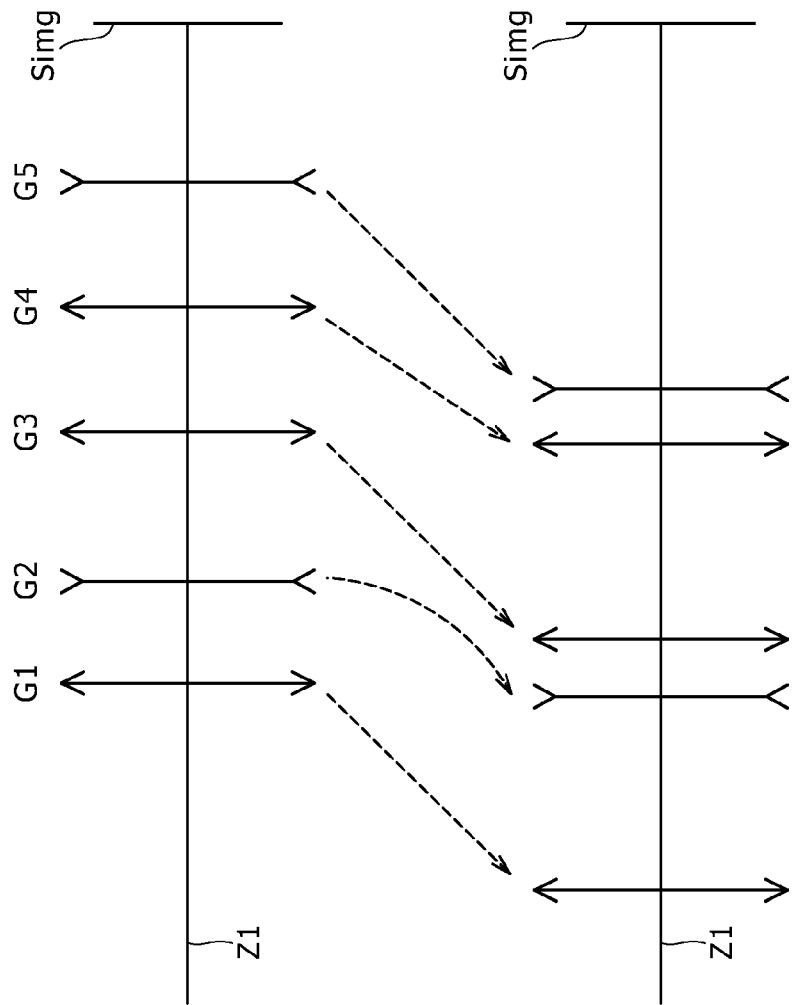

Fno=4.85

----- g-RAY
——— d-RAY
—·— C-RAY

-0.02 -0.01 0.0 0.01 0.02
SPHERICAL (mm)
ABERRATION

S T ω=13.79°

-0.02 -0.01 0.0 0.01 0.02
ASTIGMATISM (mm)

ω=13.79°

-5.0 -2.5 0.0 2.5 5.0
DISTORTION (%)

Fno=5.46

----- g-RAY
——— d-RAY
—·— C-RAY

-0.02 -0.01 0.0 0.01 0.02
SPHERICAL (mm)
ABERRATION

T S ω=6.89°

-0.02 -0.01 0.0 0.01 0.02
ASTIGMATISM (mm)

ω=6.89°

-5.0 -2.5 0.0 2.5 5.0
DISTORTION

Fno=7.30

----- g-RAY
——— d-RAY
—·— C-RAY

-0.02 -0.01 0.0 0.01 0.02
SPHERICAL (mm)
ABERRATION

T S ω=3.54°

-0.02 -0.01 0.0 0.01 0.02
ASTIGMATISM (mm)

ω=3.54°

-5.0 -2.5 0.0 2.5 5.0
DISTORTION

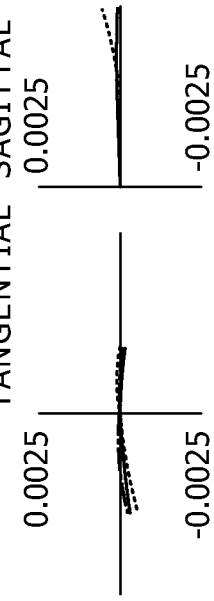

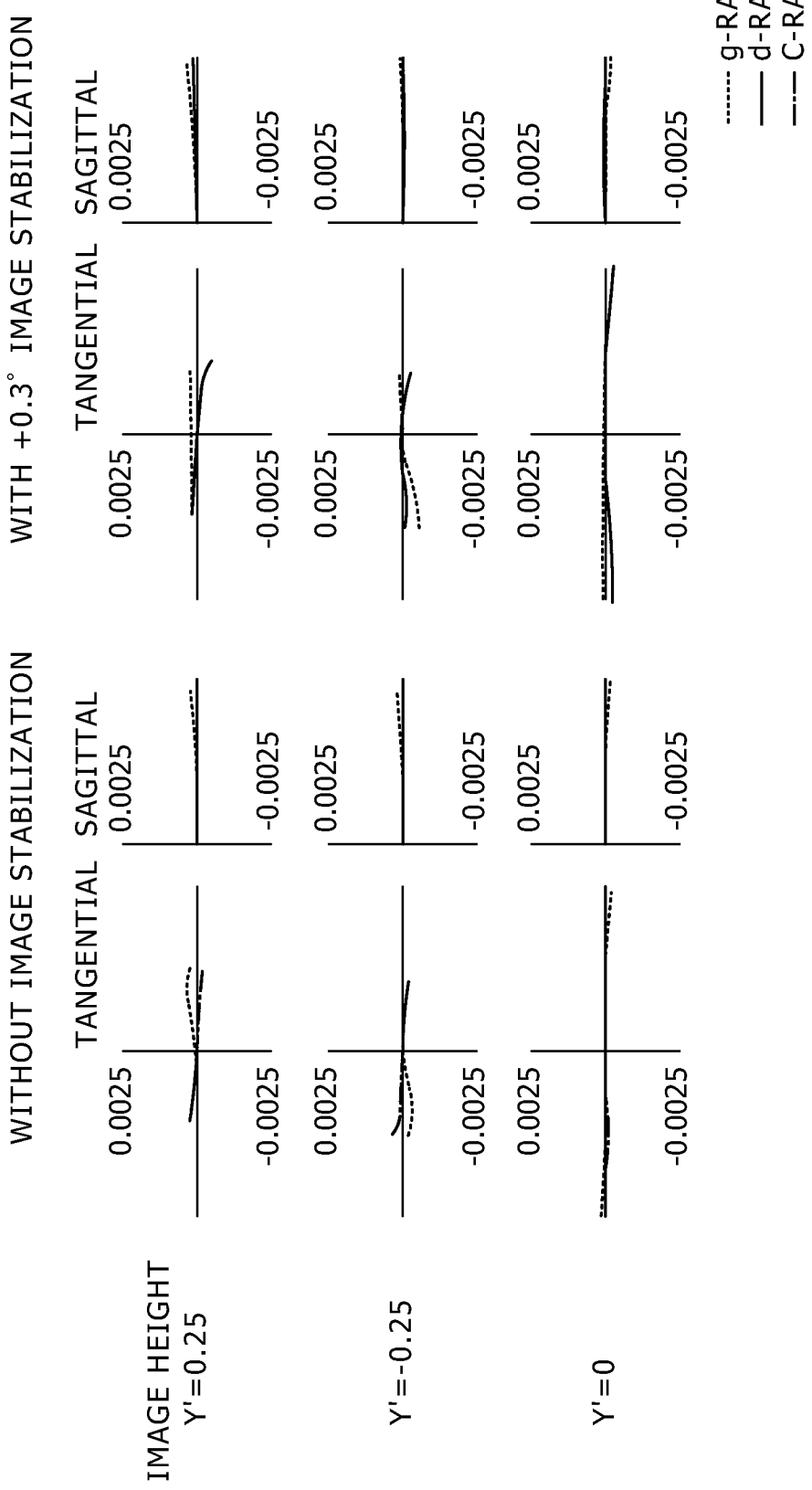

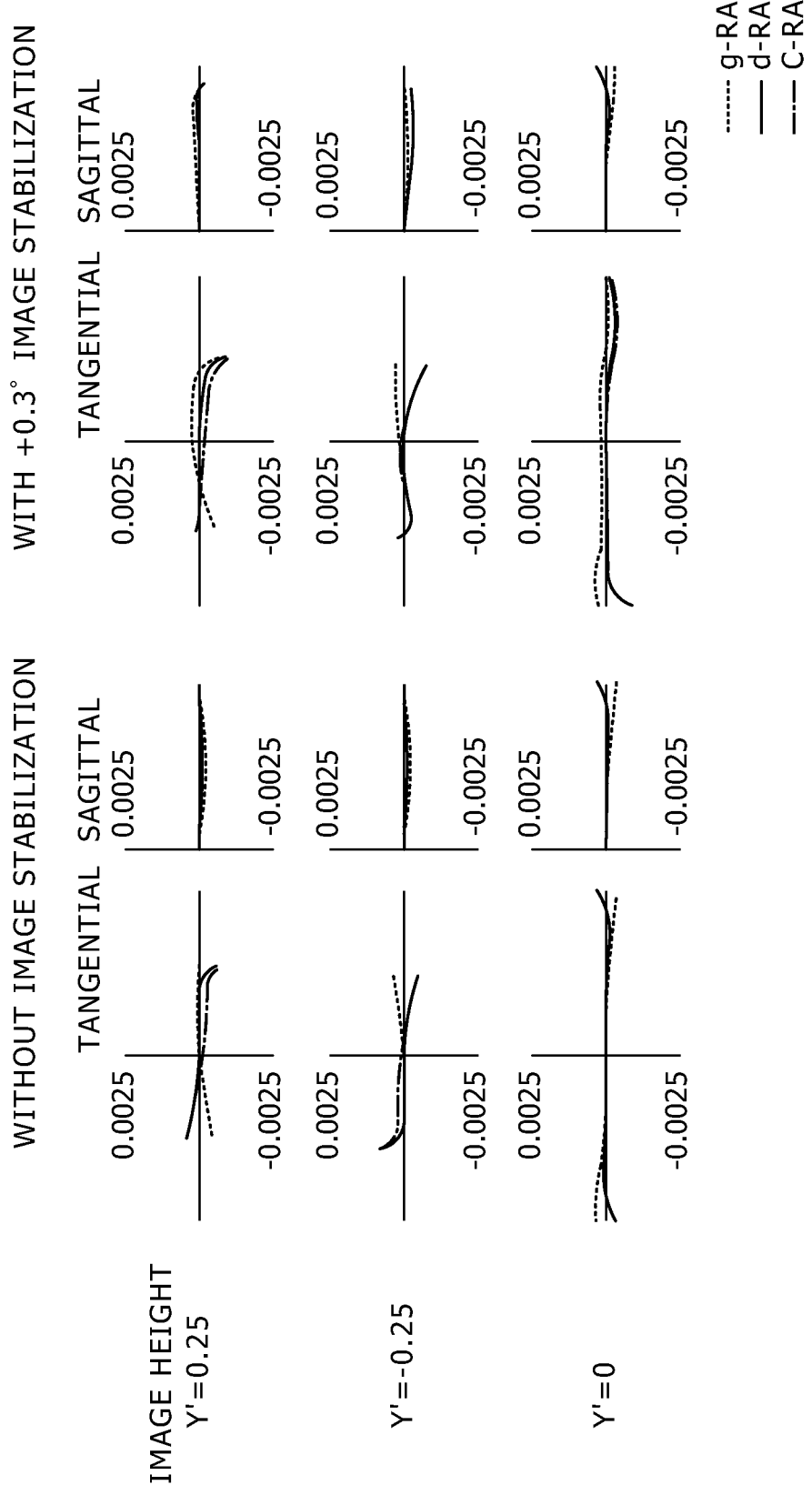

FIG.17A — WITHOUT IMAGE STABILIZATION
FIG.17B — WITH +0.3° IMAGE STABILIZATION

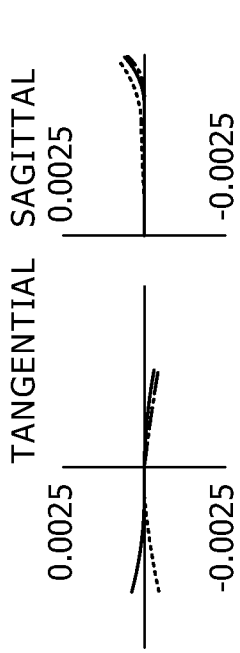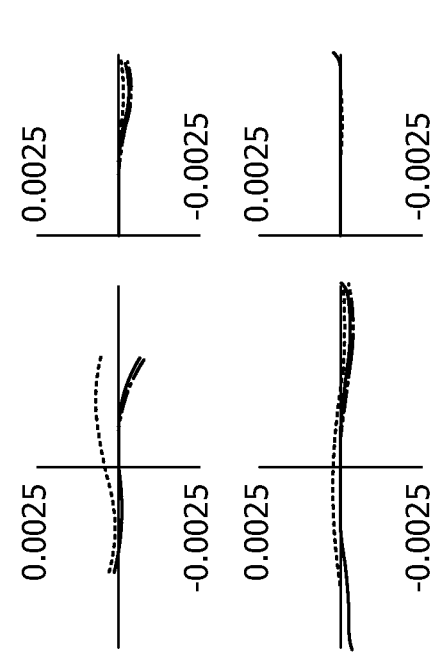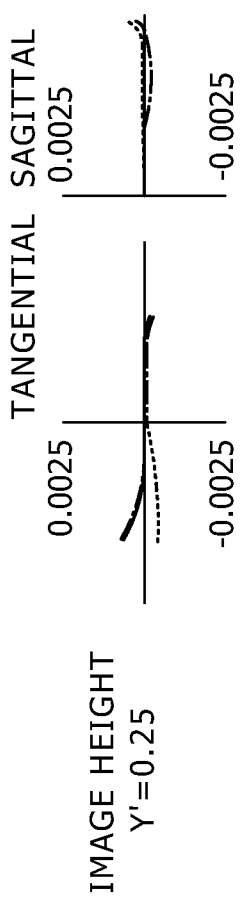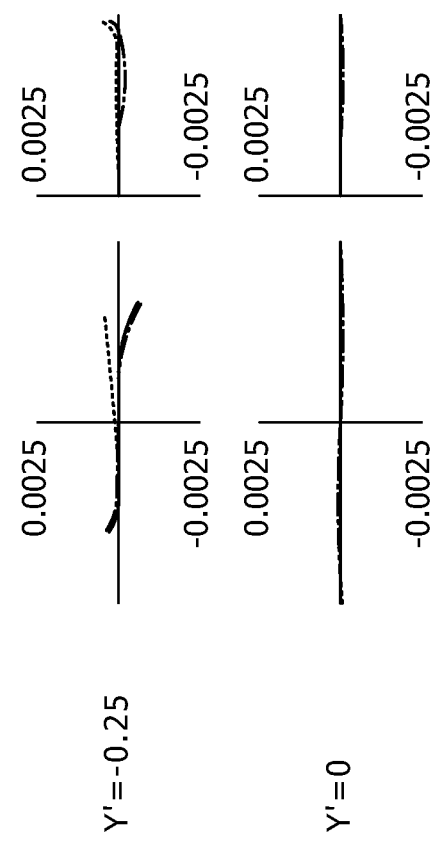
FIG.22A WITHOUT IMAGE STABILIZATION
FIG.22B WITH +0.3° IMAGE STABILIZATION

ZOOM LENS AND IMAGING DEVICE

BACKGROUND

The present disclosure relates to a zoom lens used in an interchangeable lens device of a lens-interchangeable digital camera and so forth, and an imaging device incorporating such a zoom lens.

Requirements for size reduction and portability improvement of the lens-interchangeable digital camera system are still strong. In particular, in recent years, these requirements are becoming stronger because of the rapid spread of the body of the lens-interchangeable digital camera having a mirrorless mechanism. In general, in the mirrorless lens-interchangeable digital camera, the flange focal distance is short and the body itself is also designed as small one compared with existing single-lens reflex cameras. Therefore, the lens is also required to have further reduced size so that the portability of the system may be not spoiled.

Furthermore, in recent years, a lens suitable for moving image photographing is required against the background of the spread of a lens-interchangeable digital camera having the moving image photographing function. In general, in the lens-interchangeable digital camera, a large-size imaging element is used and the actual focal length of the lens is long. Therefore, highly accurate focusing that allows withstanding against the shallow depth of field is necessary. In addition, it is also necessary for the camera to have a high-speed focusing function for object tracking. To achieve them, attainment of proper focusing sensitivity in the range from the wide angle end to the telephoto end and weight reduction of the focus lens group are required.

As the zoom lens used as the interchangeable lens of the lens-interchangeable camera, a multi-group zoom lens in which not less than three lens groups are moved is mainstream in recent years. In general, the multi-group zoom lens is advantageous in terms of aberration correction because it has high flexibility of change in the relative positions of the respective lens groups in association with magnification variation, and easily allows performance enhancement. Furthermore, by dispersing the magnification variation action to the respective lens groups, achievement of high magnification and reduction in the amount of movement of the respective groups in magnification variation are facilitated.

Japanese Patent Laid-open No. Hei 9-230238 (hereinafter, Patent Document 1) proposes a zoom lens in which a first lens group having a positive refractive index, a second lens group having negative refractive power, a third lens group having a positive refractive index, a fourth lens group having a positive refractive index, and a fifth lens group having a negative refractive index are deposed in that order from the object side. In this zoom lens, in magnification variation from the wide angle end to the telephoto end, at least the first lens group and the fifth lens group move toward the object side in such a manner that the air gap between the first lens group and the second lens group increases, and the air gap between the second lens group and the third lens group decreases, and the air gap between the fourth lens group and the fifth lens group decreases. Furthermore, at least the fourth lens group moves in such a manner that the on-axis distance between the second lens group and the fourth lens group decreases. In addition, the fourth lens group is moved along the optical axis to perform focusing on a near object.

Japanese Patent Laid-open No. Hei 8-43734 (hereinafter, Patent Document 2) proposes a zoom lens including a first lens group having positive refractive power, a second lens group having negative refractive power, a third lens group having positive refractive power, a fourth lens group having positive refractive power, and a fifth lens group having negative refractive power in that order from the object side. In this zoom lens, in magnification variation from the wide angle end to the telephoto end, at least the first lens group and the fifth lens group move toward the object side in such a manner that the air gap between the first lens group and the second lens group increases, and the air gap between the third lens group and the fourth lens group increases, and the air gap between the fourth lens group and the fifth lens group decreases. Furthermore, in magnification variation from the wide angle end to the telephoto end, the third lens group and the fifth lens group integrally move.

The zoom lenses described in the above-mentioned Patent Documents 1 and 2 are ones including five movable groups and facilitate achievement of high magnification and performance enhancement. Furthermore, they are configurations that easily allow size reduction of the lens barrel in the optical axis direction because the amount of movement of the respective groups can be suppressed by dispersing the magnification variation action to the respective groups. Moreover, a positive lens group is employed as the first lens group closest to the object side and a negative lens group is employed as the fifth lens group closest to the image side, and the telephoto ratio of the whole system is decreased. Thereby, the total length of the optical system is shortened.

Furthermore, the above-mentioned Patent Document 1 proposes that the fourth lens group close to the aperture stop is used as a focus group to thereby suppress the lens diameter and weight of the focus group and facilitate size reduction of the drive system thereof and hence the lens barrel. In addition, the focusing sensitivity suitable for moving image photographing can be set by properly setting the lateral magnification of the fourth lens group and the fifth lens group in the range from the wide angle end to the telephoto end.

However, in an embodiment example described in the above-mentioned Patent Document 1, the fourth lens group serving as the focus group is composed of at least two lenses. The individual lens elements of the optical system used in the lens-interchangeable digital camera generally have larger size and heavier weight compared with lens elements used for compact cameras and video camcorders. This applies also to the focus group. If the weight of the focus group is heavy, large driving force is necessary and therefore the size of the actuator becomes larger, which is disadvantageous in size reduction of the lens barrel. Furthermore, the silence in driving is lost and the lens becomes one that is unsuitable for moving image photographing. Therefore, further reduction in the weight of the focus group is required in the optical system of the interchangeable lens used in the lens-interchangeable digital camera.

Furthermore, although the zoom lenses described in the above-mentioned Patent Documents 1 and 2 have five lens groups and are configurations that are advantageous in achievement of high magnification and performance enhancement, the burden of magnification variation is biased toward the fifth lens group and the amount of movement of the fifth lens group in magnification variation is very large. As a result, the amount of movement of the respective groups is large in magnification variation from the wide angle end state to the telephoto end state and it is difficult to shorten the total length of the whole system at the telephoto end. In addition, generally a multistage movement structure is necessary to realize such an optical system and therefore the size increases in the radial direction.

There is a need for the present disclosure to provide a zoom lens and an imaging device that have a small-size, light-weight focus group suitable for moving image photographing.

SUMMARY

According to an embodiment of the present disclosure, there is provided a zoom lens including a first lens group configured to have positive refractive power, a second lens group configured to have negative refractive power, a third lens group configured to have positive refractive power, a fourth lens group configured to have positive refractive power, and a fifth lens group configured to have negative refractive power. The first lens group, the second lens group, the third lens group, the fourth lens group, and the fifth lens group are disposed in that order from an object side. The respective lens groups move in magnification variation from a wide angle end to a telephoto end. The fourth lens group is moved in optical axis direction to correct variation of an imaging position in association with magnification variation and perform correction of the imaging position in association with object distance change. Condition expression (1) is satisfied.

$$0.60<f1/(fw\cdot ft)^{1/2}<1.10 \qquad (1),$$

where
f1: focal length of the first lens group
fw: focal length of the whole system at the wide angle end
ft: focal length of the whole system at the telephoto end According to another embodiment of the present disclosure, there is provided an imaging device including a zoom lens and an imaging element configured to output an imaging signal depending on an optical image formed by the zoom lens. The zoom lens is configured by the zoom lens according to the above-described embodiment of the present disclosure.

In the zoom lens or the imaging device according to the embodiment of the present disclosure, the first to fifth lens groups move in magnification variation from the wide angle end to the telephoto end and the fourth lens group moves as a focus group.

According to the zoom lens or the imaging device of the embodiment of the present disclosure, the fourth lens group is used as a focus group and the configuration of the respective lens groups is optimized. Therefore, a small-size, light-weight focus group suitable for moving image photographing can be achieved.

BRIEF DESCRIPTION OF THE DRAWINGS

FIGS. 4A and 4B are explanatory diagrams showing how the respective lens groups move in magnification variation;

FIG. 5 is an aberration diagram showing aberrations of the zoom lens corresponding to numerical working example 1 at the wide angle end.

FIG. 6 is an aberration diagram showing aberrations of the zoom lens corresponding to numerical working example 1 in an intermediate focal length state.

FIG. 7 is an aberration diagram showing aberrations of the zoom lens corresponding to numerical working example 1 at the telephoto end.

FIG. 8 is an aberration diagram showing aberrations of the zoom lens corresponding to numerical working example 2 at the wide angle end.

FIG. 9 is an aberration diagram showing aberrations of the zoom lens corresponding to numerical working example 2 in an intermediate focal length state.

FIG. 10 is an aberration diagram showing aberrations of the zoom lens corresponding to numerical working example 2 at the telephoto end.

FIG. 11 is an aberration diagram showing aberrations of the zoom lens corresponding to numerical working example 3 at the wide angle end.

FIG. 12 is an aberration diagram showing aberrations of the zoom lens corresponding to numerical working example 3 in an intermediate focal length state.

FIG. 13 is an aberration diagram showing aberrations of the zoom lens corresponding to numerical working example 3 at the telephoto end.

FIG. 14A is an aberration diagram showing lateral aberrations of the zoom lens corresponding to numerical working example 1 at the wide angle end when image stabilization is not carried out, and FIG. 14B is an aberration diagram showing lateral aberrations when image stabilization is carried out;

FIG. 15A is an aberration diagram showing lateral aberrations of the zoom lens corresponding to numerical working example 1 in an intermediate focal length state when image stabilization is not carried out, and FIG. 15B is an aberration diagram showing lateral aberrations when image stabilization is carried out;

FIG. 16A is an aberration diagram showing lateral aberrations of the zoom lens corresponding to numerical working example 1 at the telephoto end when image stabilization is not carried out, and FIG. 16B is an aberration diagram showing lateral aberrations when image stabilization is carried out;

FIG. 17A is an aberration diagram showing lateral aberrations of the zoom lens corresponding to numerical working example 2 at the wide angle end when image stabilization is not carried out, and FIG. 17B is an aberration diagram showing lateral aberrations when image stabilization is carried out;

FIG. 22A is an aberration diagram showing lateral aberrations of the zoom lens corresponding to numerical working example 3 at the telephoto end when image stabilization is not carried out, and FIG. 22B is an aberration diagram showing lateral aberrations when image stabilization is carried out.

DETAILED DESCRIPTION OF THE PREFERRED EMBODIMENTS

Embodiments of the present disclosure will be described in detail below with reference to the drawings.

[Lens Configuration]

Figure 1:
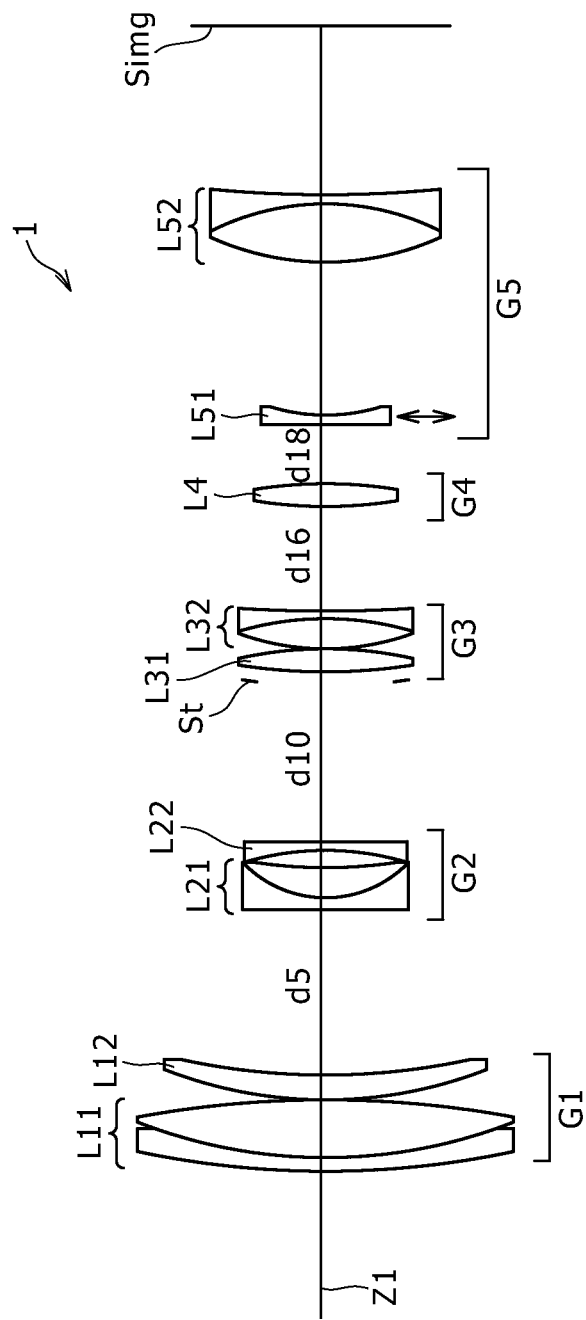
FIG. 1 is a lens sectional view that shows a first configuration example of a zoom lens according to one embodiment of the present disclosure and corresponds to numerical working example 1.
Figure 2:
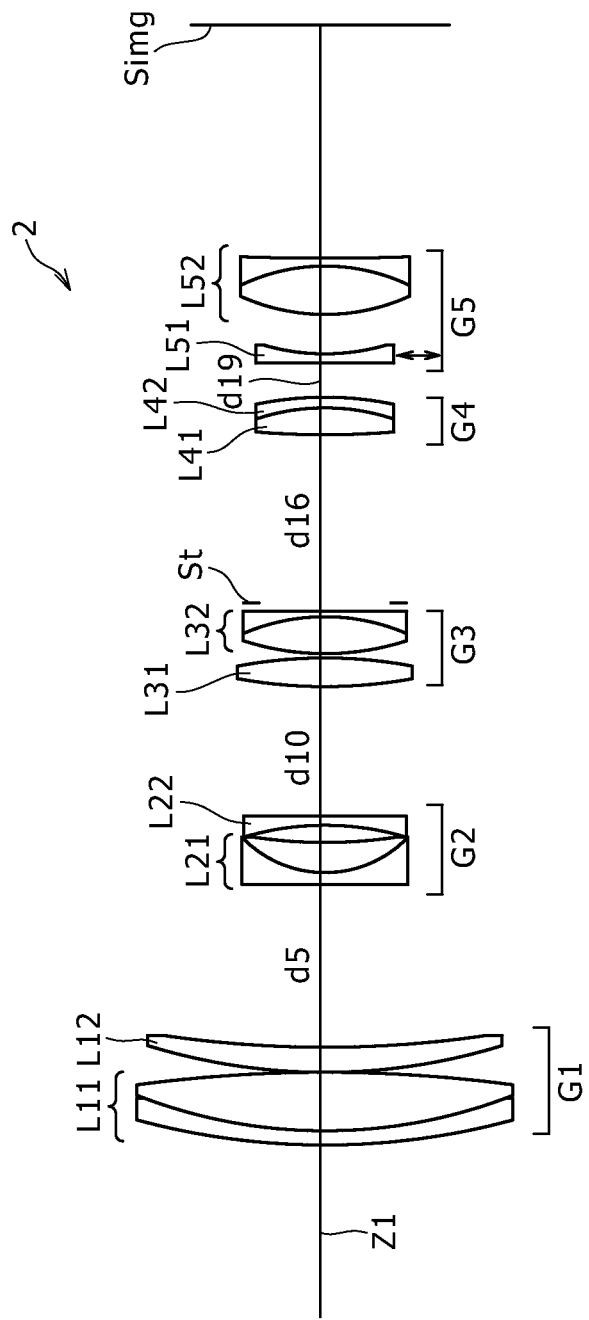
FIG. 2 is a lens sectional view that shows a second configuration example of the zoom lens and corresponds to numerical working example 2.
Figure 3:
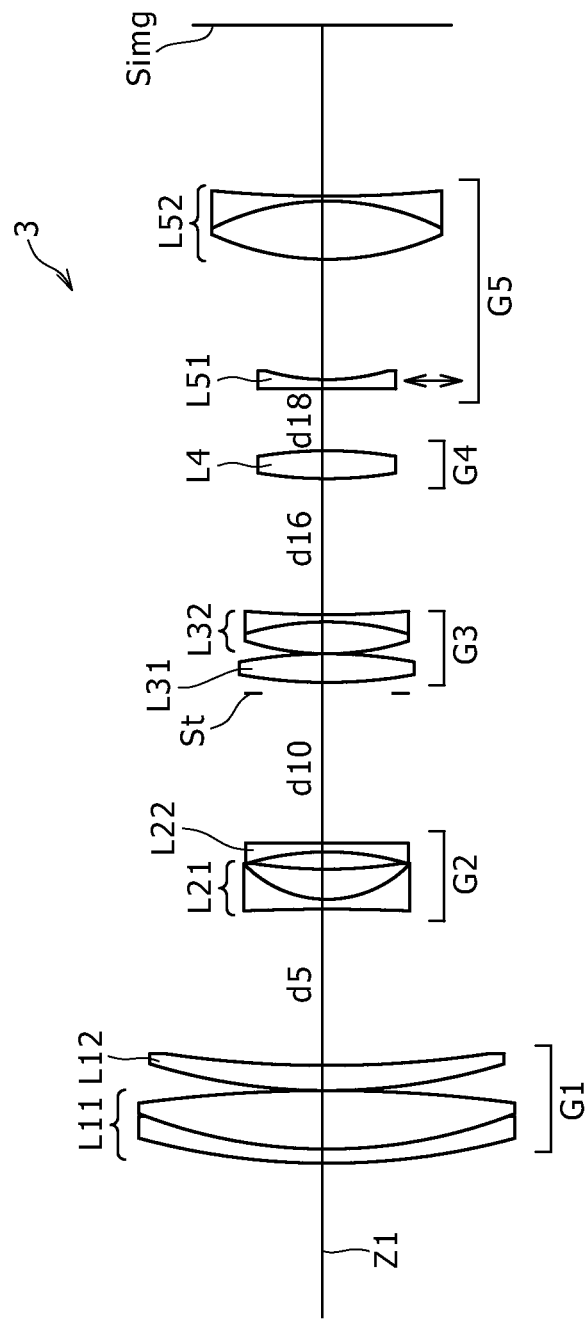
FIG. 3 is a lens sectional view that shows a third configuration example of the zoom lens and corresponds to numerical working example 3.

FIG. 1 shows a first configuration example of a zoom lens according to one embodiment of the present disclosure. This configuration example corresponds to the lens configuration of numerical working example 1 to be described later. FIG. 1 corresponds to the lens arrangement in focusing on infinity at the wide angle end. Similarly, FIG. 2 and FIG. 3 show the sectional configurations of second and third configuration examples corresponding to the lens configurations of numerical working examples 2 and 3 to be described later. In FIG. 1 to FIG. 3, symbol Simg indicates the image surface. Symbol di indicates the surface distance between the i-th surface and the i+1-th surface on an optical axis Z1. This symbol di is shown only for the surface distances of the part that changes in association with magnification variation (e.g. d5, d10, d16, d18 in FIG. 1).

The zoom lens according to the present embodiment is composed of five lens groups substantially. These five lens groups are a first lens group G1 having positive refractive power, a second lens group G2 having negative refractive power, a third lens group G3 having positive refractive power, a fourth lens group G4 having positive refractive power, and a fifth lens group G5 having negative refractive power that are disposed in that order from the object side along the optical axis Z1.

It is preferable for an aperture stop St to be disposed close and adjacent to the third lens group G3. As specific configuration examples, in zoom lenses 1 and 3 according to the first and third configuration examples, the aperture stop St is disposed near the third lens group G3 between the second lens group G2 and the third lens group G3. In a zoom lens 2 according to the second configuration example, the aperture stop St is disposed near the third lens group G3 between the third lens group G3 and the fourth lens group G4.

In the zoom lens according to the present embodiment, as shown in FIGS. 4A and 4B, the respective lens groups move in magnification variation from the wide angle end to the telephoto end. Incidentally, FIG. 4A shows the arrangement of the respective lens groups at the wide angle end and FIG. 4B shows the arrangement of the respective lens groups at the telephoto end. Furthermore, the trajectories of the movement of the respective lens groups in the magnification variation are shown by dashed lines. As shown in FIGS. 4A and 4B, in the magnification variation from the wide angle end to the telephoto end, the air gap between the first lens group G1 and the second lens group G2 increases and the air gap between the second lens group G2 and the third lens group G3 decreases. Furthermore, at least the first lens group G1, the third lens group G3, and the fifth lens group G5 monotonically move toward the object side. In addition, the fourth lens group G4 is moved in the direction of the optical axis Z1 to correct variation of the imaging position in association with the magnification variation and perform correction of the imaging position in association with the object distance change.

It is preferable that the aperture stop St and the third lens group G3 integrally move in the magnification variation. Furthermore, it is preferable that the third lens group G3 and the fifth lens group G5 integrally move along the optical axis Z1 in the magnification variation.

The zoom lens according to the present embodiment is so configured as to satisfy the following condition expressions.

$$0.60 < f1/(fw \cdot ft)^{1/2} < 1.10 \tag{1}$$

Moreover, it is preferable that the following condition expressions be accordingly selectively satisfied.

$$0 < |f2|/(fw \cdot ft)^{1/2} < 0.29 \tag{2}$$

$$0.45 < \log(Z)[\beta 2t/\beta 2w] < 0.85 \tag{3}$$

In these expressions, the respective parameters are defined as follows.

f1: focal length of the first lens group G1
f2: focal length of the second lens group G2
fw: focal length of the whole system at the wide angle end
ft: focal length of the whole system at the telephoto end
Z: magnification variation ratio
β2w: lateral magnification of the second lens group G2 at the wide angle end
β2t: lateral magnification of the second lens group G2 at the telephoto end In condition expression (3), Z is the base and [β2t/β2w] is the antilogarithm.

It is preferable for the fourth lens group G4 to have at least one aspherical surface. It is preferable for the fourth lens group G4 to be configured by a single lens. As specific configuration examples, the fourth lens group G4 is configured by a single lens (biconvex lens L4) in the zoom lenses 1 and 3 according to the first and third configuration examples.

It is preferable that the fifth lens group G5 be composed of a front group L51 having negative refractive power and a back group L52 having positive refractive power in that order from the object side and blur correction of the image be performed by moving the front group L51 in the direction perpendicular to the optical axis Z1. It is preferable for the front group L51 to have at least one aspherical surface. It is preferable for the front group L51 to be configured by a single lens.

It is preferable that the following condition expression be satisfied regarding the fifth lens group G5.

$$0.53 < f51/f5 < 1.0 \tag{4}$$

In this expression, the respective parameters are defined as follows.

f51: focal length of the front group L51
f5: focal length of the fifth lens group G5

[Operation and Effect]

The operation and effect of the zoom lens according to the present embodiment will be described below.

(Weight Reduction of Focus Group)

The zoom lens according to the present embodiment is a lens system suitable for moving image photographing. In the following, a consideration will be made about how to reduce the weight of the focus group in order to provide a zoom lens system that is more suitable for moving image photographing. For the weight reduction of the focus group, the diameter of the lens configuring the focus group is decreased as a first condition. Alternatively, the number of lenses configuring the focus group is reduced as a second condition.

To decrease the diameter of the lens configuring the focus group as the first condition, the diameter of light flux passing through the focus group is decreased. Due to this, the necessary lens diameter decreases and the center thickness necessary to ensure the edge thickness difference can also be reduced, which is advantageous in the weight reduction of the focus group.

As the second condition, a method for reducing the number of lenses configuring the focus group will be described. In general, as the number of lenses configuring this group increases, the flexibility in terms of aberration correction increases, which is more advantageous. Conversely, reducing the number of lenses makes it difficult to maintain favorable optical performance. In particular, reducing the number of lenses configuring a lens group disposed near the aperture stop causes increase in spherical aberration and comatic aberration, which significantly increase depending on the pupil height, and thus makes it difficult to maintain favorable imaging performance of the optical system. To reduce the number of lenses of a certain group under the above-described premise, the amount of generated aberration is suppressed by decreasing the diameter of light flux passing through this group all the same and decreasing the height of the passing light beam relative to the optical axis Z1.

For the above-described reason, decreasing the diameter of light flux passing through the focus group causes weight reduction of the focus group and leads to provision of the focus group suitable for moving image photographing.

(Method for Decreasing Light Flux Diameter of Focus Group)

So, a method for decreasing the diameter of light flux passing through the focus group will be specifically described. The diameter of light flux passing through the optical system is substantially determined by the aperture stop diameter. Thus, if the aperture stop diameter is decreased, naturally the light beam passage height of the fourth lens group G4 serving as the focus group becomes smaller. However, if merely the aperture stop diameter is decreased, the maximum aperture value becomes larger and attainment of the required specifications becomes difficult.

To decrease the aperture stop diameter while keeping the maximum aperture value, the configuration is so designed that the refractive power of a positive lens closer to the object than the aperture stop St is enhanced to strongly converge light flux before passage through the aperture stop so that the entrance pupil diameter may be larger than the aperture stop diameter. In the optical system in the present embodiment, the refractive power of the positive lens of the first lens group G1 is enhanced.

Condition expression (1) is to define the proper range about the focal length f1 of the first lens group G1. If the focal length f1 surpasses the upper limit of condition expression (1), the convergence action by the first lens group G1 is insufficient and the aperture stop diameter cannot be sufficiently decreased. Thus, spherical aberration and comatic aberration generated in the fourth lens group G4 and image surface variation in focusing increase. If the focal length f1 is under the lower limit of condition expression (1), the refractive power of the first lens group G1 is too strong. Therefore, the amount of generation of aberrations in this group increases and it is difficult to keep favorable imaging performance. Furthermore, the eccentricity sensitivity among the groups becomes high, which is unfavorable in terms of the manufacturing. In addition, increase in the diameter of a lens distant from the aperture stop St is caused, which is disadvantageous in size reduction.

For further size reduction, it is preferable to set the upper limit of condition expression (1) to 1.04 as shown by the following condition expression (1)'.

$$0.60 < f1/(fw \cdot ft)^{1/2} < 1.04 \qquad (1)'$$

Furthermore, for weight reduction of the focus lens group, it is more preferable to set the upper limit of condition expression (1) to 1.00 as shown by the following condition expression (1)".

$$0.60 < f1/(fw \cdot ft)^{1/2} < 1.00 \qquad (1)"$$

By simultaneously employing a form in which the aperture stop St is disposed close and adjacent to the third lens group G3 and is moved integrally with the third lens group G3 in magnification variation, the lens diameter of the fourth lens group G4 adjacent to the third lens group G3 can be suppressed to a small diameter. Furthermore, by disposing the aperture stop St adjacent to the third lens group G3 as described above, the symmetry of the optical system around the aperture stop is made favorable and size increase of the lens systems closer to the object and image sides than the aperture stop St can be avoided. Thus, this form is effective for size reduction of the lens barrel and lens weight reduction. Moreover, by separating the fourth lens group G4 serving as the focus group from the aperture stop St, the weight of the movable part of the fourth lens group G4 is reduced and size increase of the actuator can be avoided. Thus, this is also advantageous in size reduction.

If the refractive power of a positive lens of the first lens group G1 is enhanced in accordance with condition expression (1), the angle formed by off-axis light flux that has passed through the first lens group G1 and the optical axis Z1 becomes larger. Thus, the lens diameter of the whole optical system becomes larger or it becomes difficult to ensure relative illumination. For preventing this, it is preferable to simultaneously enhance also the refractive power of a negative lens of the second lens group G2 to decrease the angle formed by off-axis light flux that has passed through the second lens group G2 and the optical axis Z1. This can avoid generation of an off-axis aberration and increase in the diameter of a lens disposed closer to the image than the aperture stop St.

Condition expression (2) is to define the proper range about the focal length f2 of the second lens group G2. If the focal length f2 surpasses the upper limit of condition expression (2), the refractive power of the second lens group G2 is insufficient relative to the refractive power of the first lens group G1. Thus, the angle formed by off-axis light flux that has passed through the second lens group G2 and the optical axis Z1 is large and it is difficult to keep the off-axis performance. Furthermore, increase in the diameter of a lens closer to the image than the aperture stop St is caused, which is disadvantageous in size reduction. In addition, the size and weight of the focus group also become larger. If the focal length f2 is under the lower limit of condition expression (2), the refractive power of the second lens group is too strong. Therefore, the amount of aberrations generated in the second lens group and the eccentricity sensitivity among the groups are large and thus this is not preferable.

It is preferable to set the upper limit of condition expression (2) to 0.27 as shown by the following condition expression (2)' in order to obtain more favorable off-axis performance.

$$0<|f2|/(fw\cdot ft)^{1/2}<0.27 \qquad (2)'$$

Furthermore, for weight reduction of the focus lens group, it is more preferable to set the upper limit of condition expression (2) to 0.23 as shown by the following condition expression (2)".

$$0<|f2|/(fw\cdot ft)^{1/2}<0.23 \qquad (2)''$$

(Method for Suppressing Aberration Variation in Magnification Variation and Method for Size Reduction)

As a preferred embodiment, by employing an aspherical shape as the shape of at least one surface of the fourth lens group G4 configuring the focus group, spherical aberration and comatic aberration and image surface variation in association with focusing can be favorably corrected. This can provide a zoom lens system having favorable imaging performance at all zoom positions and at all focus positions.

As a more preferred embodiment, if the fourth lens group G4 serving as the focus group is configured by a single lens, an extremely light-weight focus group that is the most suitable for moving image photographing can be provided.

Condition expression (3) is to define the proper range about the magnification variation burden of the second lens group G2. By dispersing the magnification variation burden of the fifth lens group G5 to the second lens group G2 and decreasing the amount of movement of the fifth lens group G5 in association with magnification variation, the amount of movement of the respective groups in magnification variation becomes smaller and the lens barrel can be configured with a single-stage movement structure. Thus, size reduction of the lens barrel is facilitated. If the refractive power of the second lens group G2 is so set as to satisfy condition expression (2) at this time, the second lens group G2 can obtain a high magnification variation ratio with a small amount of movement and size reduction is not precluded.

For further performance enhancement and size reduction, it is preferable to set the numerical value range of condition expression (3) as shown by the following condition expression (3)'.

$$0.52<\log(Z)[\beta 2t/\beta 2w]<0.75 \qquad (3)'$$

In the zoom lens according to the present embodiment, it is preferable that the third lens group G3 and the fifth lens group G5 integrally move along the optical axis Z1 in magnification variation in order to avoid increase in the complexity of the lens barrel structure due to employment of a multi-group zoom system. Employing the form in which the third lens group G3 and the fifth lens group G5 integrally move in magnification variation makes it possible to employ a structure in which the cam cylinder of the third lens group G3, the fourth lens group G4, and the fifth lens group G5 is monolithically configured and the fourth lens group G4 serving as the focus group moves therein. As a result, the lens barrel structure is simplified and size reduction and cost reduction of the lens barrel are facilitated. Furthermore, these lens groups, whose relative eccentricity sensitivity among the groups tends to be high, can be assembled with high relative position accuracy. This configuration suits recent interchangeable lenses incorporating the actuator of the focus group in the lens.

(Method for Image Stabilization and Blur Correction)

In the zoom lens according to the present embodiment, blur correction of the photographed image can be performed by dividing the fifth lens group G5 into the front group L51 having negative refractive power and the back group L52 having positive refractive power in that order from the object side and moving the front group L51 in the direction perpendicular to the optical axis Z1.

Condition expression (4) is to define the proper range about the refractive power of the front group L51 serving as an image stabilization lens group. If f51/f5 surpasses the upper limit of condition expression (4), the divergence action at the front group L51 is insufficient. Thus, the back focus becomes redundant in order to obtain the desired image height at the image surface and the compactness of the lens barrel is impaired. Therefore, this is not preferable. Furthermore, the diameter of the image stabilization lens group becomes larger and size increase of the actuator to drive the image stabilization lens group is caused, which is disadvantageous in size reduction of the lens barrel. Therefore, this is not preferable. If f51/f5 is under the lower limit of condition expression (4), the refractive power of the front group L51 is too strong and it is difficult to correct aberrations with a small number of lenses. Therefore, it is difficult to configure the image stabilization lens group with a small number of lenses. If the number of lenses is increased, the size of the actuator to drive the image stabilization lens group becomes larger, which is disadvantageous in size reduction of the lens barrel. Therefore, this is not preferable.

For favorable imaging performance in image stabilization and size reduction of the lens barrel, it is more preferable to set the numerical value range of condition expression (4) as shown by the following condition expression (4)'.

$$0.6<f51/f5<0.9 \qquad (4)'$$

As a preferred embodiment, an aspherical shape may be employed as the shape of at least one surface of the front group L51 configuring the image stabilization lens group. This can provide a zoom lens that achieves suppression of the amount of aberration variation when the image stabilization lens group moves in the optical axis direction in association with blur correction and has favorable imaging performance also in image stabilization.

As a more preferred embodiment, if the front group L51 serving as the image stabilization lens group is configured by a single lens, an extremely light-weight image stabilization lens group can be realized and size reduction of the actuator to drive the image stabilization lens group is facilitated. Thus, a small-size zoom lens can be provided.

As described above, the present embodiment can provide the following zoom lens system. Specifically, this zoom lens system has a focus group suitable for moving image photographing and has favorable imaging performance with small aberration variation in every situation from focusing on infinity to focusing on a near object. In addition, this zoom lens system has a function of blur correction of the photographed image and is suitable for size reduction.

[Example of Application to Imaging Device]

Figure 23:
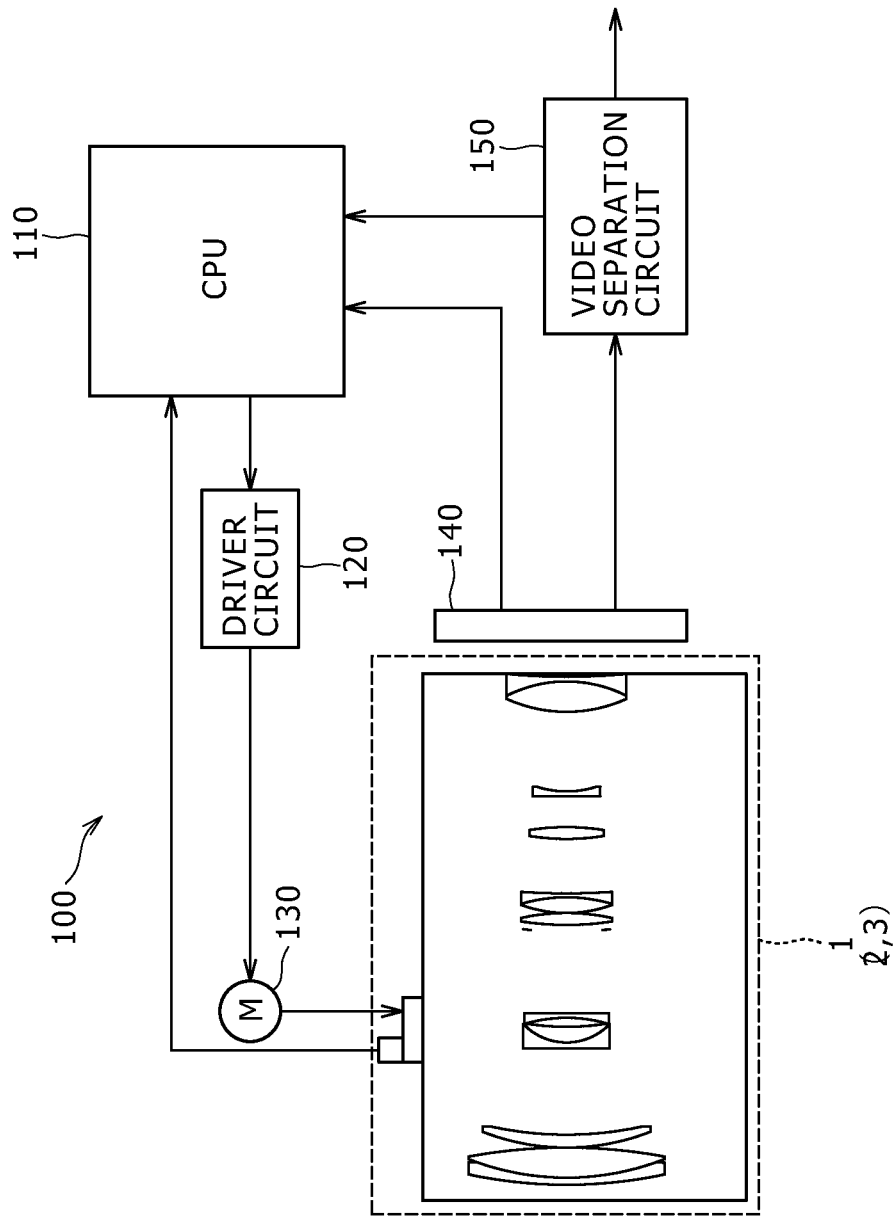
FIG. 23 is a block diagram showing one configuration example of an imaging device.

FIG. 23 shows one configuration example of an imaging device 100 to which the zoom lens according to the present embodiment is applied. This imaging device 100 is e.g. a digital still camera. A central processing unit (CPU) 110 carries out overall control of the whole device, and an optical image obtained by the zoom lens 1 shown in FIG. 1 (or zoom lens 2 or 3 shown in FIG. 2 or FIG. 3) is converted to an electrical signal by an imaging element 140 and then it is sent out to a video separation circuit 150. As the imaging element 140, a photoelectric conversion element of e.g. charge coupled device (CCD) or complementary metal-oxide semiconductor (CMOS) is used. The video separation circuit 150 generates a focus control signal based on the electrical signal and sends out it to the CPU 110. In addition, the video separation circuit 150 sends out a video signal corresponding to the video part, of the electrical signal, to a video processing circuit (not shown) at the subsequent stage. The video processing circuit performs conversion to a signal format suitable for the subsequent processing and the converted signal is used for video display processing for a display section, recording processing for a predetermined recording medium, data transfer processing via a predetermined communication interface, and so forth.

The CPU 110 is supplied with an operation signal of focusing operation and so forth from the external and executes various kinds of processing in accordance with the operation signal. For example when being supplied with a focusing operation signal by a focusing button, the CPU 110 makes a drive motor 130 operate via a driver circuit 120 so as to provide the focusing state in accordance with this command. Thereby, the CPU 110 of the imaging device 100 moves the focus lens group (fourth lens group G4) along the optical axis in accordance with the focusing operation signal. The CPU 110 of the imaging device 100 makes the position information of the focus lens group at this time be fed back thereto and refers to the position information when next time moving the focus lens group via the drive motor 130. Similarly, when being supplied with an operation signal of zooming, the CPU 110 makes the drive motor 130 operate via the driver circuit 120.

This imaging device 100 includes also a shake detector to detect a shake of the device accompanying a camera shake. The CPU 110 makes the drive motor 130 operate via the driver circuit 120 based on a signal output from the shake detector. Thereby, the CPU 110 moves the image stabilization lens group (front group L51 of the fifth lens group G5) in the direction perpendicular to the optical axis Z1 depending on the amount of shake.

In the above-described embodiment, a description is made about the case in which a digital still camera is taken as a specific subject of the imaging device 100. However, the specific subject is not limited thereto and other various pieces of electronic apparatus may be employed as a specific subject of the imaging device 100. For example, other various pieces of electronic apparatus, such as a lens-interchangeable camera, a digital video camcorder, a cellular phone in which a digital video camcorder or the like is incorporated, and a personal digital assistant (PDA), may be employed as a specific subject of the imaging device 100.

WORKING EXAMPLES

Specific numerical working examples of the zoom lens according to the present embodiment will be described below.

The meanings of symbols and so forth shown in the following respective tables and explanation are as follows. "Surface number" indicates the number of the i-th surface given the number in such a manner that the surface of the constituent element closest to the object is defined as the first surface and the number sequentially increases toward the image side. "Ri" denotes the radius of curvature (mm) of the i-th surface. "di" denotes the distance (mm) on the optical axis between the i-th surface and the i+1-th surface. "ni" denotes the value of the refractive index with respect to the d-ray (wavelength is 587.6 nm), of the material of the optical element having the i-th surface. "vi" denotes the value of the Abbe number with respect to the d-ray, of the material of the optical element having the i-th surface. Furthermore, Fno denotes the F-number, f denotes the focal length of the whole system, ω denotes the half field angle, and Bf denotes the back focus (distance from the last lens surface to the image surface Simg).

Symbol "STO" indicates the stop surface. The surface whose surface number is given "*" is an aspherical surface. The shape of the aspherical surface is represented by the following expression. In the data of aspherical coefficients, symbol "E" indicates that the numerical value subsequent thereto is an "exponent" with 10 as the base and indicates that the numerical value in front of "E" is multiplied by the numerical value represented by the exponential function with 10 as the base. For example, "1.0E-05" means "1.0×10$^{-5}$."

[Expression 1]

$$z(y) = \frac{y^2/R}{1+(1-(1+k)y^2/R^2)^{1/2}} + C_4 \cdot y^4 + C_6 \cdot y^6 + C_8 \cdot y^8 + \ldots$$

In this expression, the respective parameters are defined as follows.
y: height in the direction perpendicular to the optical axis
z(y): distance from the lens surface vertex in the optical axis direction at height y
R: paraxial radius of curvature at the lens surface vertex
k: conic coefficient
Ci: i-th order aspherical coefficient Numerical Working Example 1

[Table 1] to [Table 3] show specific lens data corresponding to the zoom lens 1 according to the first configuration example shown in FIG. 1. In particular, [Table 1] shows the basic lens data thereof and [Table 2] shows data relating to the aspherical surface. [Table 3] shows other data. In this zoom lens 1, the respective lens groups move in association with magnification variation. Therefore, the values of the surface distances of the front and back of the respective lens groups are variable. The data of these variable surface distances is shown in [Table 3].

In this zoom lens 1, the first lens group G1 is configured by a cemented lens L11 composed of a negative meniscus lens having a convex surface oriented toward the object side and a biconvex lens and a positive meniscus lens L12 having a convex surface oriented toward the object side in that order from the object side. The second lens group G2 is configured by a cemented lens L21 composed of a biconcave lens and a positive meniscus lens having a convex surface oriented toward the object side and a negative lens L22 having a biconcave shape in that order from the object side. The third lens group G3 is configured by a biconvex lens L31 and a cemented lens L32 composed of a biconvex lens and a biconcave lens in that order from the object side. The fourth lens group G4 is configured by the biconvex lens L4 whose both surfaces have an aspherical shape. The fifth lens group G5 is composed of the front group L51 and the back group L52 in that order from the object side. The front group L51 is a biconcave lens whose both surfaces have an aspherical shape. The back group L52 is a cemented lens composed of a biconvex lens and a biconcave lens.

In this zoom lens 1, in focusing from an object at infinity to a near object, the fourth lens group G4 moves toward the object side and the third lens group G3 and the fifth lens group G5 integrally move in the optical axis direction in magnification variation. The aperture stop St is disposed between the second lens group G2 and the third lens group G3 and moves integrally with the third lens group G3 in the magnification variation. Blur correction of the photographed image is performed by moving the front group L51 of the fifth lens group G5 in the direction perpendicular to the optical axis Z1.

TABLE 1

Working example 1

| | Surface number | Radius of curvature Ri | Surface distance di | Refractive index ni | Abbe number νi |
|---|---|---|---|---|---|
| G1 | 1 | 1.677 | 0.027 | 1.9108 | 35.25 |
| | 2 | 0.940 | 0.110 | 1.4970 | 81.61 |
| | 3 | −1.868 | 0.004 | | |
| | 4 | 0.888 | 0.043 | 1.4875 | 70.44 |
| | 5 | 1.359 | d5 | | |
| G2 | 6 | −3.649 | 0.020 | 1.8061 | 40.73 |
| | 7 | 0.220 | 0.060 | 1.8467 | 23.78 |
| | 8 | 0.965 | 0.030 | | |
| | 9 | −0.619 | 0.016 | 1.9108 | 35.25 |
| | 10 | 7.532 | d10 | | |
| | 11(STO) | ∞ | 0.018 | | |
| G3 | 12 | 1.137 | 0.041 | 1.9108 | 35.25 |
| | 13 | −1.033 | 0.005 | | |
| | 14 | 0.492 | 0.057 | 1.4970 | 81.61 |
| | 15 | −0.619 | 0.015 | 1.8467 | 23.78 |
| | 16 | 2.535 | d16 | | |
| G4 | *17 | 0.913 | 0.043 | 1.4971 | 81.56 |
| | *18 | −0.779 | d18 | | |
| G5 | *19 | −1.183 | 0.016 | 1.5920 | 67.02 |
| | *20 | 0.456 | 0.294 | | |
| | 21 | 0.496 | 0.111 | 1.6034 | 38.01 |
| | 22 | −0.468 | 0.018 | 1.8348 | 42.72 |
| | 23 | 1.826 | Bf | | |

(*aspherical surface)

TABLE 2

Working example 1. Aspherical data

| Surface number | k | C4 | C6 | C8 | C10 |
|---|---|---|---|---|---|
| 17 | 0.000 | −7.41237E−01 | −3.10429E+01 | 1.32468E+04 | 8.96268E+03 |
| 18 | 0.000 | 2.12773E+00 | 9.44297E+01 | 4.03824E+03 | 2.78726E+05 |
| 19 | 0.000 | 4.32488E+01 | −2.60480E+03 | 5.69705E+04 | 2.78726E+05 |
| 20 | 0.000 | 4.43360E+01 | −2.77038E+03 | 7.06497E+04 | −2.78726E+05 |

TABLE 3

Working example 1

| | Wide angle end | Intermediate | Telephoto end |
|---|---|---|---|
| f | 1.00 | 1.91 | 3.62 |
| Fno | 4.64 | 5.40 | 6.49 |
| ω | 13.95 | 7.43 | 3.92 |
| d5 | 0.321 | 0.605 | 0.793 |
| d10 | 0.307 | 0.143 | 0.027 |
| d16 | 0.200 | 0.192 | 0.258 |
| d18 | 0.115 | 0.122 | 0.057 |
| Bf | 0.320 | 0.507 | 0.929 |

Numerical Working Example 2

[Table 4] to [Table 6] show specific lens data corresponding to the zoom lens 2 according to the second configuration example shown in FIG. 2. In particular, [Table 4] shows the basic lens data thereof and [Table 5] shows data relating to the aspherical surface. [Table 6] shows other data. In this zoom lens 2, the respective lens groups move in association with magnification variation. Therefore, the values of the surface distances of the front and back of the respective lens groups are variable. The data of these variable surface distances is shown in [Table 6].

In this zoom lens 2, the first lens group G1 is configured by the cemented lens L11 composed of a negative meniscus lens having a convex surface oriented toward the object side and a biconvex lens and the positive meniscus lens L12 having a convex surface oriented toward the object side in that order from the object side. The second lens group G2 is configured by the cemented lens L21 composed of a biconcave lens and a positive meniscus lens having a convex surface oriented toward the object side and the negative lens L22 that has a concave surface oriented toward the object side and has a meniscus shape in that order from the object side. The third lens group G3 is configured by the biconvex lens L31 and the cemented lens L32 composed of a biconvex lens and a biconcave lens in that order from the object side. The fourth lens group G4 is configured by a cemented lens composed of a biconvex lens L41 whose surface on the object side has an aspherical shape and a negative meniscus lens L42 having a concave surface oriented toward the object side. The fifth lens group G5 is composed of the front group L51 and the back group L52 in that order from the object side. The front group L51 is the biconcave lens L51 whose both surfaces have an aspherical shape. The back group L52 is a cemented lens composed of a biconvex lens and a biconcave lens.

In this zoom lens 2, in focusing from an object at infinity to a near object, the fourth lens group G4 moves toward the object side and the third lens group G3 and the fifth lens group G5 integrally move in the optical axis direction in magnification variation. The aperture stop St is disposed between the third lens group G3 and the fourth lens group G4 and moves integrally with the third lens group G3 in the magnification variation. Blur correction of the photographed image is performed by moving the front group L51 of the fifth lens group G5 in the direction perpendicular to the optical axis Z1.

TABLE 4

Working example 2

| | Surface number | Radius of curvature Ri | Surface distance di | Refractive index ni | Abbe number νi |
|---|---|---|---|---|---|
| G1 | 1 | 1.467 | 0.026 | 1.8467 | 23.78 |
| | 2 | 0.979 | 0.107 | 1.4970 | 81.61 |
| | 3 | −2.367 | 0.002 | | |
| | 4 | 1.089 | 0.048 | 1.4875 | 70.44 |
| | 5 | 2.365 | d5 | | |
| G2 | 6 | −3.004 | 0.021 | 1.8042 | 46.50 |
| | 7 | 0.201 | 0.056 | 1.8467 | 23.78 |
| | 8 | 0.585 | 0.041 | | |
| | 9 | −0.388 | 0.019 | 1.8348 | 42.72 |
| | 10 | −2.194 | d10 | | |
| G3 | 11 | 1.054 | 0.054 | 1.8340 | 37.34 |
| | 12 | −0.632 | 0.007 | | |
| | 13 | 0.502 | 0.066 | 1.4970 | 81.61 |

TABLE 4-continued

Working example 2

| | Surface number | Radius of curvature Ri | Surface distance di | Refractive index ni | Abbe number vi |
|---|---|---|---|---|---|
| | 14 | −0.444 | 0.012 | 1.8467 | 23.78 |
| | 15 | 9.444 | 0.016 | | |
| | 16(STO) | ∞ | d16 | | |
| G4 | *17 | 1.118 | 0.052 | 1.5168 | 64.20 |
| | 18 | −0.378 | 0.018 | 1.9037 | 31.31 |
| | 19 | −0.544 | d19 | | |
| G5 | *20 | −4.322 | 0.016 | 1.5533 | 71.68 |
| | *21 | 0.268 | 0.076 | | |
| | 22 | 0.428 | 0.091 | 1.6398 | 34.57 |
| | 23 | −0.337 | 0.016 | 1.8830 | 40.80 |
| | 24 | 9.205 | Bf | | |

(*aspherical surface)

TABLE 5

Working example 2. Aspherical data

| Surface number | k | C4 | C6 | C8 | C10 |
|---|---|---|---|---|---|
| 17 | 0.000 | −2.29517E+00 | −1.96039E+02 | 1.97168E+04 | −6.24609E+05 |
| 20 | 0.000 | −3.96153E+00 | 0.00000E+00 | 0.00000E+00 | 0.00000E+00 |
| 21 | 0.000 | −8.42628E+00 | −1.49727E+02 | 8.98228E+03 | −2.43759E+05 |

TABLE 6

Working example 2

| | Wide angle end | Intermediate | Telephoto end |
|---|---|---|---|
| f | 1.00 | 2.00 | 3.94 |
| Fno | 4.45 | 5.46 | 7.30 |
| ω | 13.79 | 6.89 | 3.54 |
| d5 | 0.297 | 0.542 | 0.705 |
| d10 | 0.248 | 0.112 | 0.028 |
| d16 | 0.319 | 0.271 | 0.352 |
| d19 | 0.066 | 0.114 | 0.034 |
| Bf | 0.441 | 0.633 | 1.041 |

Numerical Working Example 3

[Table 7] to [Table 9] show specific lens data corresponding to the zoom lens 3 according to the third configuration example shown in FIG. 3. In particular, [Table 7] shows the basic lens data thereof and [Table 8] shows data relating to the aspherical surface. [Table 9] shows other data. In this zoom lens 3, the respective lens groups move in association with magnification variation. Therefore, the values of the surface distances of the front and back of the respective lens groups are variable. The data of these variable surface distances is shown in [Table 9].

In this zoom lens 3, the first lens group G1 is configured by the cemented lens L11 composed of a negative meniscus lens having a convex surface oriented toward the object side and a biconvex lens and the positive meniscus lens L12 having a convex surface oriented toward the object side in that order from the object side. The second lens group G2 is configured by the cemented lens L21 composed of a biconcave lens and a positive meniscus lens having a convex surface oriented toward the object side and the negative lens L22 that has a concave surface oriented toward the object side and has a meniscus shape in that order from the object side. The third lens group G3 is configured by the biconvex lens L31 and the cemented lens L32 composed of a biconvex lens and a biconcave lens in that order from the object side. The fourth lens group G4 is configured by the biconvex lens L4 whose surface on the object side has an aspherical shape. The fifth lens group G5 is composed of the front group L51 and the back group L52 in that order from the object side. The front group L51 is a biconcave lens whose both surfaces have an aspherical shape. The back group L52 is a cemented lens composed of a biconvex lens and a biconcave lens.

In this zoom lens 3, in focusing from an object at infinity to a near object, the fourth lens group G4 moves toward the object side and the third lens group G3 and the fifth lens group G5 integrally move in the optical axis direction in magnification variation. The aperture stop St is disposed between the second lens group G2 and the third lens group G3 and moves integrally with the third lens group G3 in the magnification variation. Blur correction of the photographed image is performed by moving the front group L51 of the fifth lens group G5 in the direction perpendicular to the optical axis Z1.

TABLE 7

Working example 3

| | Surface number | Radius of curvature Ri | Surface distance di | Refractive index ni | Abbe number vi |
|---|---|---|---|---|---|
| G1 | 1 | 1.499 | 0.027 | 1.8061 | 33.27 |
| | 2 | 0.878 | 0.116 | 1.4970 | 81.61 |
| | 3 | −2.145 | 0.004 | | |
| | 4 | 1.101 | 0.051 | 1.4970 | 81.61 |
| | 5 | 1.740 | d5 | | |
| G2 | 6 | −2.908 | 0.021 | 1.7859 | 43.93 |
| | 7 | 0.241 | 0.055 | 1.8467 | 23.78 |
| | 8 | 0.767 | 0.036 | | |
| | 9 | −0.523 | 0.018 | 1.8348 | 42.72 |
| | 10 | −8.838 | d10 | | |
| | 11(STO) | ∞ | 0.018 | | |
| G3 | 12 | 0.882 | 0.046 | 1.9037 | 31.31 |
| | 13 | −0.838 | 0.005 | | |
| | 14 | 0.456 | 0.064 | 1.4970 | 81.61 |
| | 15 | −0.523 | 0.013 | 1.8467 | 23.78 |
| | 16 | 0.942 | d16 | | |
| G4 | *17 | 0.743 | 0.053 | 1.4875 | 70.44 |
| | 18 | −0.662 | d18 | | |
| G5 | *19 | −8.903 | 0.016 | 1.5533 | 71.68 |
| | *20 | 0.301 | 0.231 | | |
| | 21 | 0.529 | 0.101 | 1.5927 | 35.45 |
| | 22 | −0.536 | 0.016 | 1.8830 | 40.80 |
| | 23 | 3.417 | Bf | | |

(*aspherical surface)

TABLE 8

Working example 3 .Aspherical data

| Surface number | k | C4 | C6 | C8 | C10 |
|---|---|---|---|---|---|
| 17 | 0.000 | −3.91591E+00 | −6.36994E+01 | 6.22255E+03 | −1.58779E+05 |
| 19 | 0.000 | −4.72994E+00 | 0.00000E+00 | 0.00000E+00 | 0.00000E+00 |
| 20 | 0.000 | −7.75169E+00 | −2.04868E+02 | 1.31859E+04 | −3.39909E+05 |

TABLE 9

Working example 3

|  | Wide angle end | Intermediate | Telephoto end |
|---|---|---|---|
| f | 1.00 | 2.00 | 3.45 |
| Fno | 4.66 | 5.27 | 6.48 |
| ω | 13.97 | 6.97 | 4.10 |
| d5 | 0.285 | 0.581 | 0.723 |
| d10 | 0.286 | 0.125 | 0.028 |
| d16 | 0.263 | 0.257 | 0.298 |
| d18 | 0.115 | 0.121 | 0.080 |
| Bf | 0.333 | 0.545 | 0.911 |

Other Numerical Data of Each Working Example

[Table 10] shows compiled data of values relating to the above-described respective condition expressions about each numerical working example. As is understood from [Table 10], the values of each numerical working example fall within the numerical value ranges of the respective condition expressions.

TABLE 10

| Condition expression | Working example 1 | Working example 2 | Working example 3 |
|---|---|---|---|
| fw | 1.000 | 1.000 | 1.000 |
| ft | 3.624 | 3.938 | 3.455 |
| Z | 3.624 | 3.938 | 3.455 |
| f1 | 1.771 | 1.494 | 1.709 |
| f2 | −0.390 | −0.296 | −0.372 |
| β2w | −0.423 | −0.388 | 0.412 |
| β2t | −0.867 | −0.835 | −0.801 |
| f1/(fw · ft)$^{1/2}$ | 0.930 | 0.753 | 0.920 |
| |f2|/(fw · ft)$^{1/2}$ | 0.205 | 0.149 | 0.200 |
| log (Z) [β2t/β2w] | 0.557 | 0.559 | 0.536 |
| f51/f5 | 0.773 | 0.649 | 0.766 |

[Aberration Performance]

FIGS. 5A to 22B show the aberration performance of each numerical working example. The aberrations shown in FIGS. 5A to 22B are each one in focusing on infinity.

Figure 5A:
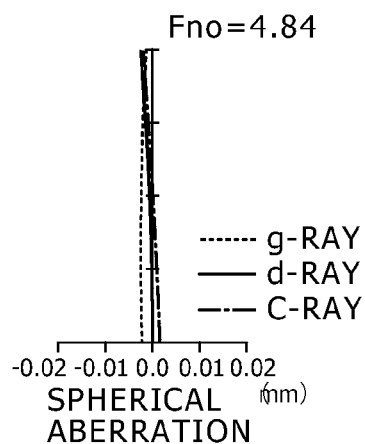
FIG. 5A shows a spherical aberration.
Figure 5B:
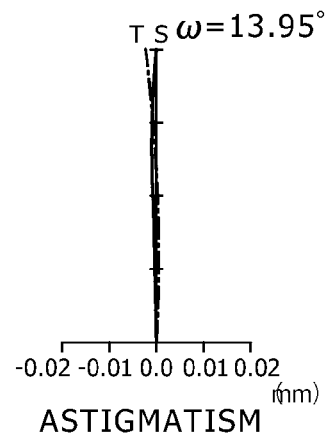
FIG. 5B shows astigmatism.
Figure 5C:
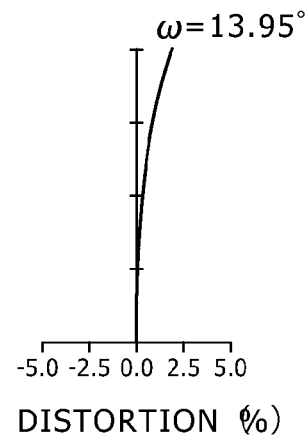
FIG. 5C shows distortion.
Figure 6A:
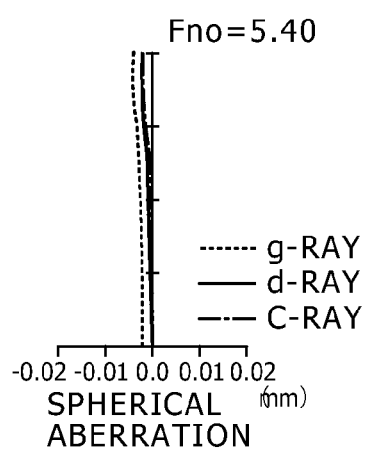
FIG. 6A shows a spherical aberration.
Figure 6B:
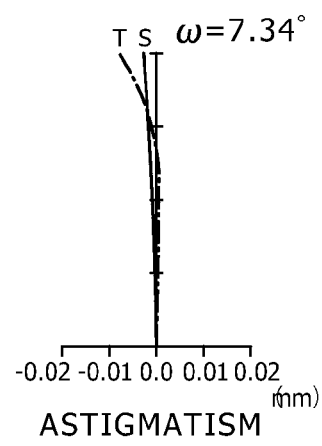
FIG. 6B shows astigmatism.
Figure 6C:
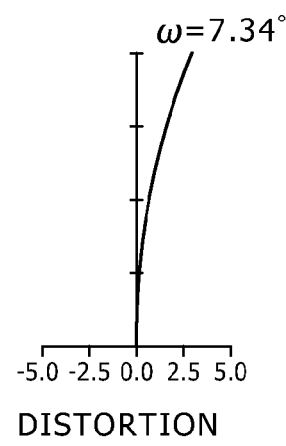
FIG. 6C shows distortion.
Figure 7A:
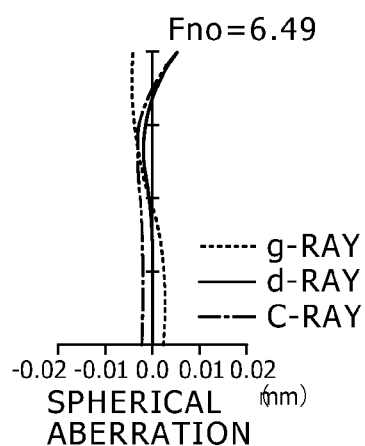
FIG. 7A shows a spherical aberration.
Figure 7B:
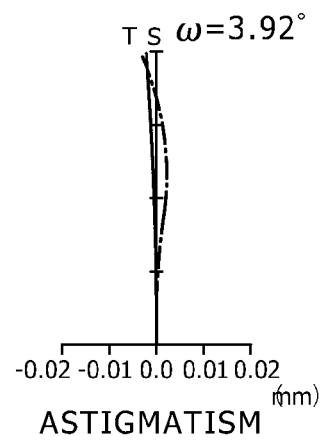
FIG. 7B shows astigmatism.
Figure 7C:
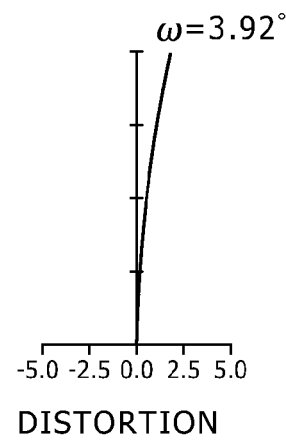
FIG. 7C shows distortion.
Figure 8A:
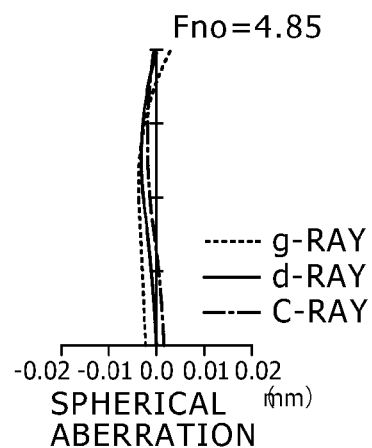
FIG. 8A shows a spherical aberration.
Figure 8B:
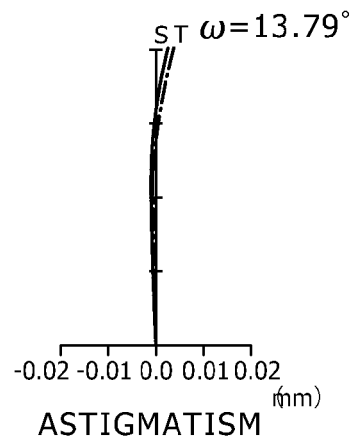
FIG. 8B shows astigmatism.
Figure 8C:
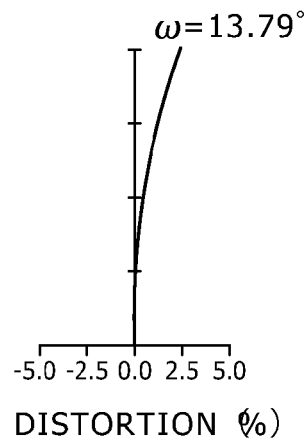
FIG. 8C shows distortion.
Figure 9A:
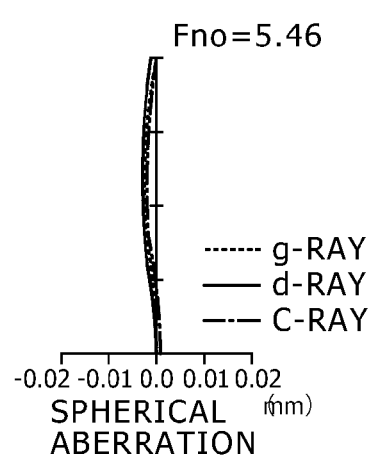
FIG. 9A shows a spherical aberration.
Figure 9B:
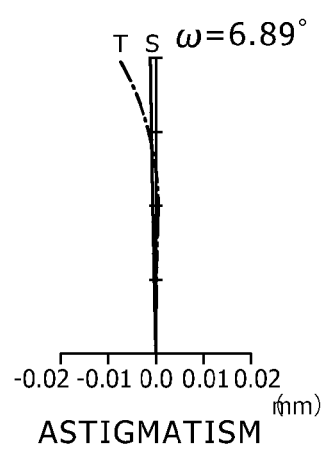
FIG. 9B shows astigmatism.
Figure 9C:
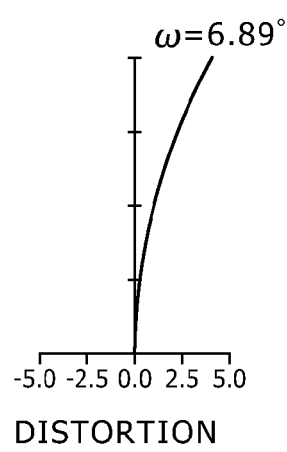
FIG. 9C shows distortion.
Figure 10A:
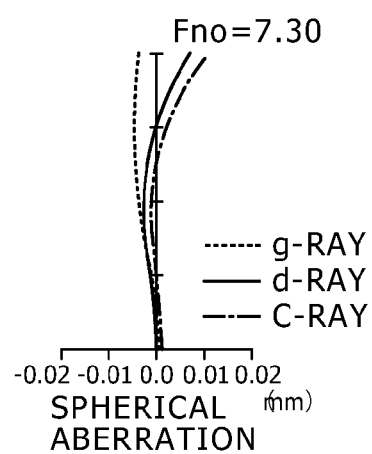
FIG. 10A shows a spherical aberration.
Figure 10B:
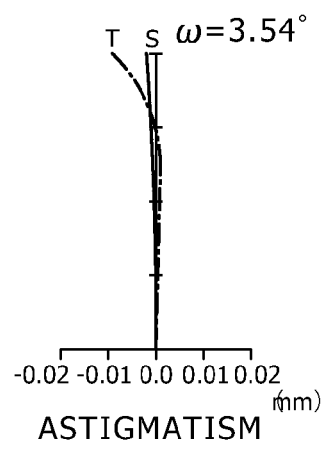
FIG. 10B shows astigmatism.
Figure 10C:
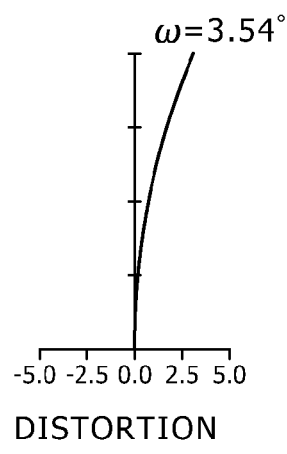
FIG. 10C shows distortion.
Figure 11A:
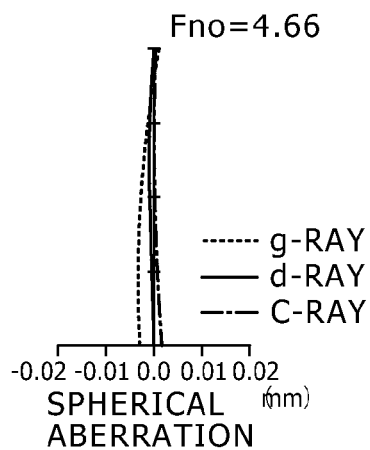
FIG. 11A shows a spherical aberration.
Figure 11B:
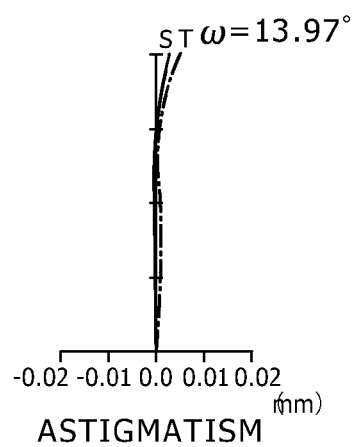
FIG. 11B shows astigmatism.
Figure 11C:
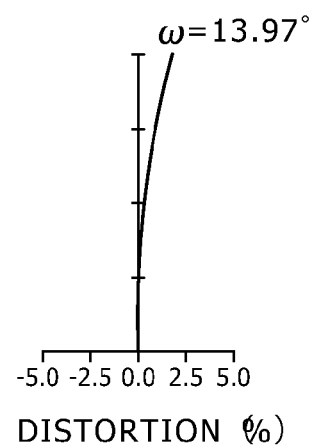
FIG. 11C shows distortion.
Figure 12A:
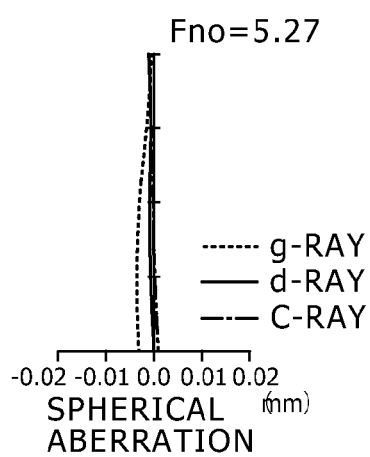
FIG. 12A shows a spherical aberration.
Figure 12B:
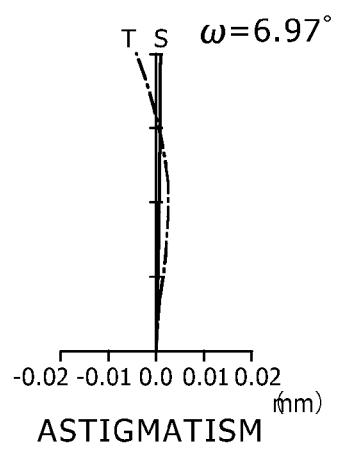
FIG. 12B shows astigmatism.
Figure 12C:
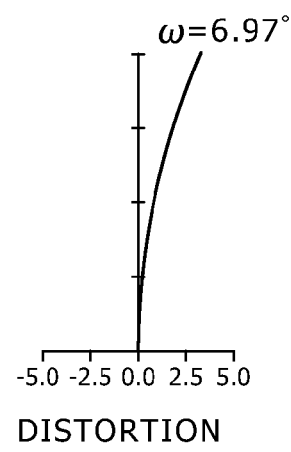
FIG. 12C shows distortion.
Figure 13A:
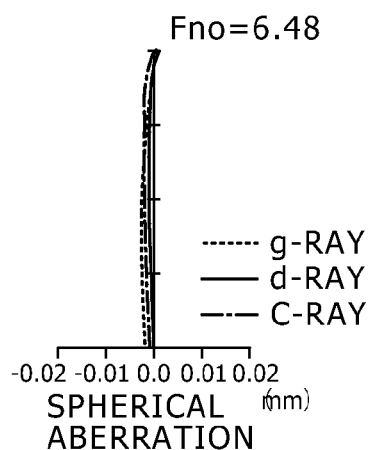
FIG. 13A shows a spherical aberration.
Figure 13B:
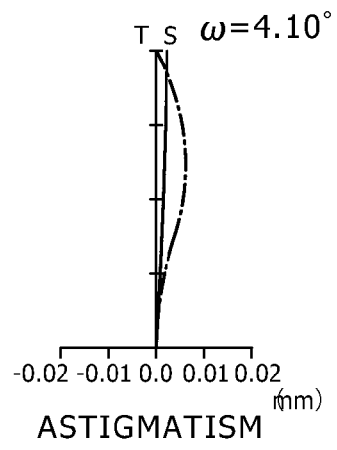
FIG. 13B shows astigmatism.
Figure 13C:
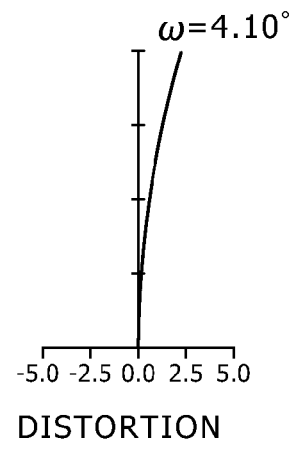
FIG. 13C shows distortion.
Figure 18A:
FIG. 18A is an aberration diagram showing lateral aberrations of the zoom lens corresponding to numerical working example 2 in an intermediate focal length state when image stabilization is not carried out.
Figure 18B:
FIG. 18B is an aberration diagram showing lateral aberrations when image stabilization is carried out.
Figure 19A:
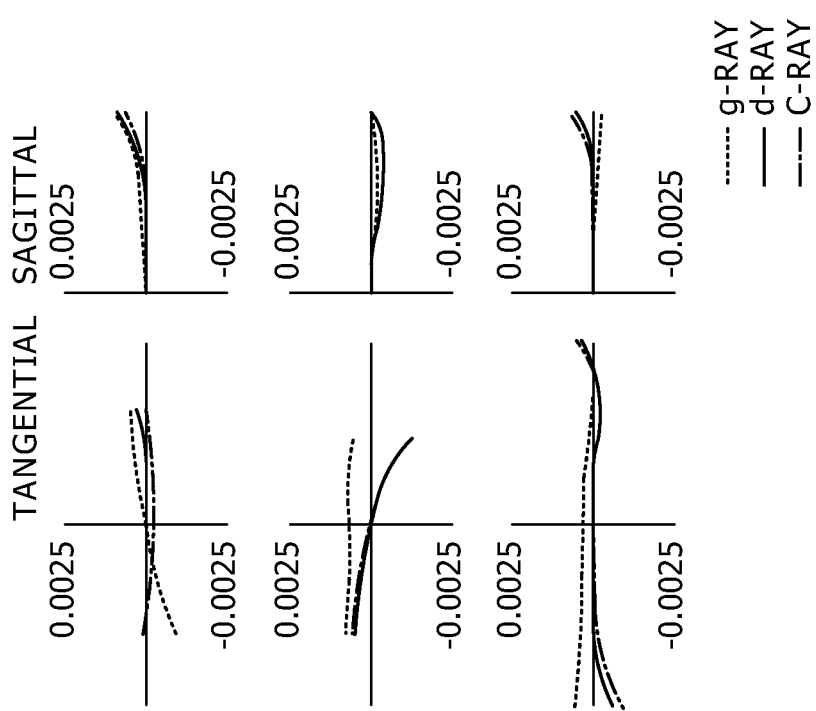
FIG. 19A is an aberration diagram showing lateral aberrations of the zoom lens corresponding to numerical working example 2 at the telephoto end when image stabilization is not carried out.
Figure 19B:
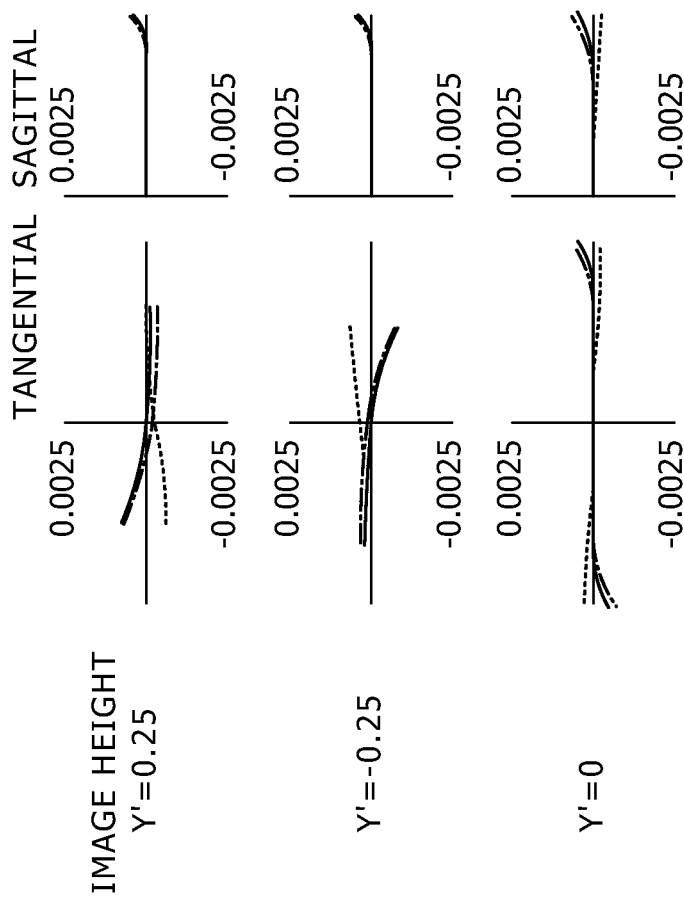
FIG. 19B is an aberration diagram showing lateral aberrations when image stabilization is carried out.
Figures 20A, 20B:
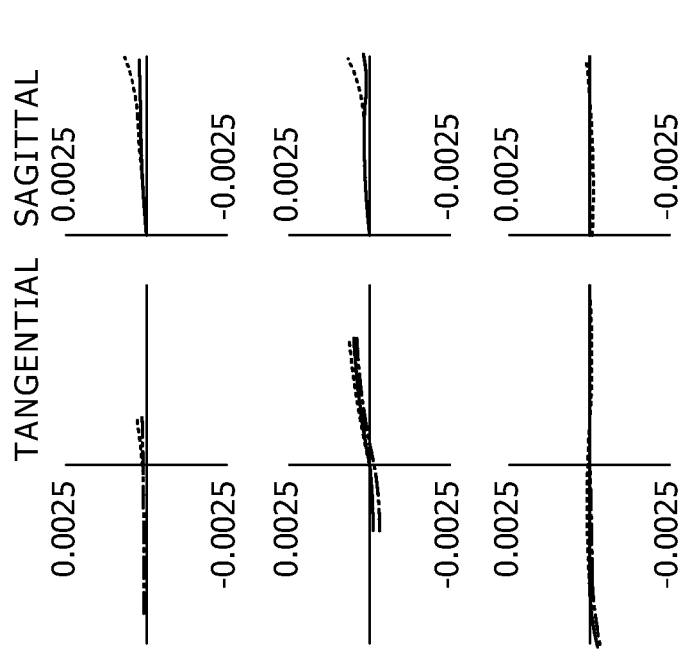
FIG. 20A is an aberration diagram showing lateral aberrations of the zoom lens corresponding to numerical working example 3 at the wide angle end when image stabilization is not carried out.
FIG. 20B is an aberration diagram showing lateral aberrations when image stabilization is carried out.
Figures 21A, 21B:
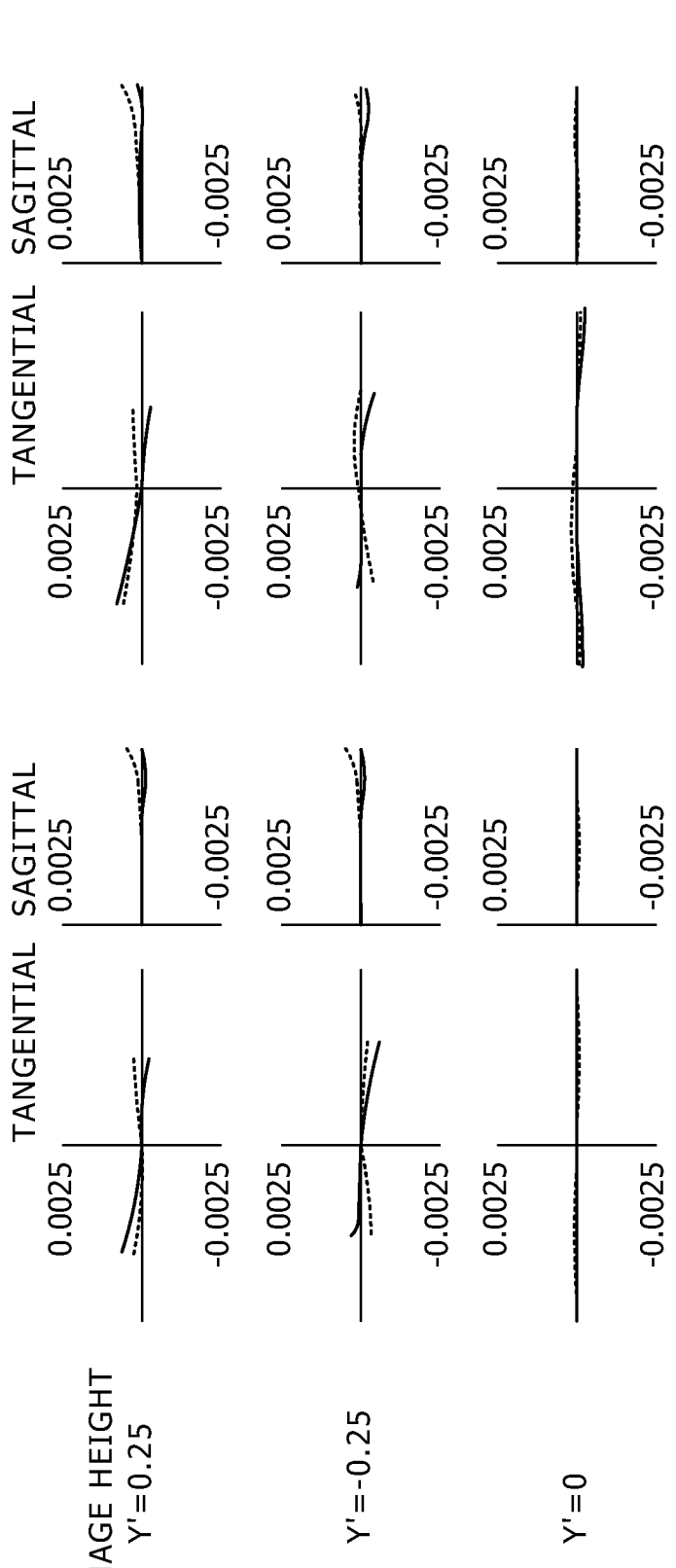
FIG. 21A is an aberration diagram showing lateral aberrations of the zoom lens corresponding to numerical working example 3 in an intermediate focal length state when image stabilization is not carried out.
FIG. 21B is an aberration diagram showing lateral aberrations when image stabilization is carried out.

FIGS. 5A to 5C show spherical aberration, astigmatism, and distortion, respectively, of the zoom lens 1 corresponding to numerical working example 1 at the wide angle end. FIGS. 6A to 6C show the same respective aberrations in an intermediate focal length state. FIGS. 7A to 7C show the same respective aberrations at the telephoto end. In these respective aberration diagrams, the aberrations about the d-ray (587.6 nm) as the reference wavelength are shown. In the spherical aberration diagram, the aberrations about the g-ray (435.84 nm) and the C-ray (656.28 nm) are also shown. In the astigmatism diagram, S (solid line) indicates the aberration in the sagittal direction and T (one-dot chain line) indicates the aberration in the meridional direction. Symbol Fno denotes the F-number and ω denotes the half field angle.

Similarly, spherical aberration, astigmatism, and distortion about the zoom lens 2 corresponding to numerical working example 2 are shown in FIGS. 8A to 10C. Similarly, spherical aberration, astigmatism, and distortion about the zoom lens 3 corresponding to numerical working example 3 are shown in FIGS. 11A to 13C.

FIG. 14A shows lateral aberrations of the zoom lens 1 corresponding to numerical working example 1 at the wide angle end when image stabilization is not carried out, and FIG. 14B shows lateral aberrations when image stabilization is carried out. When image stabilization is not carried out, the image stabilization lens group (front group L51 of the fifth lens group G5) exists at the reference position. When image stabilization is carried out, the image stabilization lens group is in such a state as to be shifted from the reference position in the direction perpendicular to the optical axis. The lateral aberrations of FIG. 14B when image stabilization is carried out are aberrations when a shake angle of +0.3° is corrected by the image stabilization lens group. Similarly, FIGS. 15A and 15B show lateral aberrations in the intermediate focal length state when image stabilization is not carried out and when image stabilization is carried out. FIGS. 16A and 16B show lateral aberrations at the telephoto end when image stabilization is not carried out and when image stabilization is carried out.

Similarly, lateral aberrations when image stabilization is not carried out and when image stabilization is carried out regarding the zoom lens 2 corresponding to numerical working example 2 are shown in FIGS. 17A to 19B. Lateral aberrations when image stabilization is not carried out and when image stabilization is carried out regarding the zoom lens 3 corresponding to numerical working example 3 are shown in FIGS. 20A to 22B.

As is understood from the above-described respective aberration diagrams, regarding each working example, the respective aberrations are corrected in a well-balanced manner in each magnification variation range from the wide angle end to the telephoto end. Furthermore, the aberrations when image blur is corrected are also favorable.

As is understood from the above-described respective numerical data and the respective aberration diagrams, the following zoom lens can be realized. Specifically, this zoom lens has a focus group suitable for moving image photographing and has favorable imaging performance with small aberration variation in every situation from focusing on infinity to focusing on a near object. In addition, this zoom lens has a function of blur correction of the photographed image and has reduced size.

<Other Embodiments>

The technique based on the present disclosure is not limited by the explanation of the above-described embodiments and working examples and various modified embodiments are possible.

For example, the shapes and numerical values of the respective parts shown in the above-described respective numerical working examples are each merely one example of concretization for carrying out the present technique, and the technical range of the present technique shall not be interpreted in a limited manner by them.

Moreover, although the configurations composed of five lens groups are explained in the above-described embodiments and working examples, a configuration further including a lens that does not have refractive power substantially may be employed.

Furthermore, for example, the present technique can take the following configurations.

[1]
A zoom lens including:
a first lens group configured to have positive refractive power;
a second lens group configured to have negative refractive power;
a third lens group configured to have positive refractive power;
a fourth lens group configured to have positive refractive power; and
a fifth lens group configured to have negative refractive power, wherein
the first lens group, the second lens group, the third lens group, the fourth lens group, and the fifth lens group are disposed in that order from an object side,
the respective lens groups move in magnification variation from a wide angle end to a telephoto end,
the fourth lens group is moved in optical axis direction to correct variation of an imaging position in association with magnification variation and perform correction of the imaging position in association with object distance change, and
condition expression (1) is satisfied.

$$0.60 < f1/(fw \cdot ft)^{1/2} < 1.10 \tag{1},$$

where
f1: focal length of the first lens group
fw: focal length of a whole system at the wide angle end
ft: focal length of the whole system at the telephoto end

[2]
The zoom lens according to the above-described [1], wherein
an aperture stop is disposed close and adjacent to the third lens group, and
the third lens group and the aperture stop integrally move in magnification variation.

[3]
The zoom lens according to the above-described [1] or [2], wherein
condition expression (2) is satisfied.

$$0 < |f2|/(fw \cdot ft)^{1/2} < 0.29 \tag{2},$$

where
f2: focal length of the second lens group

[4]
The zoom lens according to any one of the above-described [1] to [3], wherein
the fourth lens group has at least one aspherical surface.

[5]
The zoom lens according to any one of the above-described [1] to [4], wherein
the fourth lens group is configured by a single lens.

[6]
The zoom lens according to any one of the above-described [1] to [5], wherein
condition expression (3) is satisfied.

$$0.45 < \log(Z)[\beta 2t/\beta 2w] < 0.85 \tag{3},$$

where
Z is a base and [β2t/β2w] is an antilogarithm
Z: magnification variation ratio
β2w: lateral magnification of the second lens group at the wide angle end
β2t: lateral magnification of the second lens group at the telephoto end

[7]
The zoom lens according to any one of the above-described [1] to [6], wherein
the third lens group and the fifth lens group integrally move along an optical axis in magnification variation.

[8]
The zoom lens according to any one of the above-described [1] to [7], wherein
the fifth lens group is configured by a front group having negative refractive power and a back group having positive refractive power in that order from an object side, and blur correction of an image is performed by moving the front group in direction perpendicular to an optical axis, and
condition expression (4) is satisfied.

$$0.53 < f51/f5 < 1.0 \tag{4},$$

where
f51: focal length of the front group
f5: focal length of the fifth lens group

[9]
The zoom lens according to the above-described [8], wherein
the front group has at least one aspherical surface.

[10]
The zoom lens according to the above-described [8] or [9], wherein
the front group is configured by a single lens.

[11]
The zoom lens according to any one of the above-described [1] to [10], further including
a lens that does not have refractive power substantially.

[12]
An imaging device including:
a zoom lens; and
an imaging element configured to output an imaging signal depending on an optical image formed by the zoom lens, wherein
in the zoom lens,
a first lens group having positive refractive power, a second lens group having negative refractive power, a third lens group having positive refractive power, a fourth lens group having positive refractive power, and a fifth lens group having negative refractive power are disposed in that order from an object side,
the respective lens groups move in magnification variation from a wide angle end to a telephoto end,
the fourth lens group is moved in optical axis direction to correct variation of an imaging position in association with magnification variation and perform correction of the imaging position in association with object distance change, and
condition expression (1) is satisfied.

$$0.60 < f1/(fw \cdot ft)^{1/2} < 1.10 \tag{1},$$

where
f1: focal length of the first lens group
fw: focal length of a whole system at the wide angle end
ft: focal length of the whole system at the telephoto end

[13]
The imaging device according to the above-described [12], wherein the zoom lens further includes a lens that does not have refractive power substantially.

The present disclosure contains subject matter related to that disclosed in Japanese Priority Patent Application JP 2011-171728 filed in the Japan Patent Office on Aug. 5, 2011, the entire content of which is hereby incorporated by reference.

What is claimed is:

1. A zoom lens, comprising:
a first lens group configured to have positive refractive power;
a second lens group configured to have negative refractive power;
a third lens group configured to have positive refractive power;
a fourth lens group configured to have positive refractive power; and
a fifth lens group configured to have negative refractive power, wherein
the first lens group, the second lens group, the third lens group, the fourth lens group, and the fifth lens group are disposed in that order from an object side,
the respective lens groups move in magnification variation from a wide angle end to a telephoto end,
the fourth lens group is moved along an optical axis to correct variation of an imaging position in association with magnification variation and perform correction of the imaging position in association with object distance change, and
condition expression (1) is satisfied:

$$0.60 < f1/(fw \cdot ft)^{1/2} < 1.10 \qquad (1),$$

where
f1: focal length of the first lens group
fw: focal length of the zoom lens at the wide angle end
ft: focal length of the zoom lens at the telephoto end,
wherein, the first lens group is configured by a first lens group cemented lens having a first lens group negative meniscus lens with a convex surface oriented toward the object side and a first lens group biconvex lens cemented together and having a first lens group positive meniscus lens having a convex surface oriented toward the object side in that order from the object side, the second lens group is configured by a second lens group cemented lens having a second lens group biconcave lens and a second lens group positive meniscus lens with a convex surface oriented toward the object side cemented together and a second lens group negative lens having a biconcave shape in that order from the object side, the third lens group is configured by a third lens group biconvex lens and a third lens group cemented lens having a third lens group biconvex lens and a third lens group biconcave lens cemented to third lens group biconvex lens and arranged in that order from the object side, the fourth lens group is configured by a single fourth lens group biconvex lens having both surfaces being aspherical in shape and the fifth lens group is configured by a fifth lens group front group and a fifth lens group back group in that order from the object side with the fifth lens group front group having a biconcave lens with both surfaces being aspherical in shape and the fifth lens group back group is a fifth lens group cemented lens composed of a fifth lens group biconvex lens and a fifth lens group biconcave lens cemented together,
wherein, as the first, second, third, fourth and fifth lens groups respectively move from the wide angle end to the telephoto end, each one of the first, second, third, fourth and fifth lens groups respectively moves away from a reference image surface, and
wherein the first lens group, the third lens group and the fifth lens group monotonically move toward the object side.

* * * * *